(12) United States Patent
Ganesan et al.

(10) Patent No.: US 7,627,888 B2
(45) Date of Patent: Dec. 1, 2009

(54) METHOD AND SYSTEM FOR KEEPING A LIBRARY OF TITLES UPDATED

(75) Inventors: Prasanna Ganesan, Menlo Park, CA (US); Shahriyar Matloub, Los Altos, CA (US); Tony Miranz, Palo Alto, CA (US); Alain Rossmann, Palo Alto, CA (US)

(73) Assignee: VUDU, Inc., Santa Clara, CA (US)

( * ) Notice: Subject to any disclaimer, the term of this patent is extended or adjusted under 35 U.S.C. 154(b) by 949 days.

(21) Appl. No.: 11/076,334

(22) Filed: Mar. 9, 2005

(65) Prior Publication Data

US 2006/0218219 A1    Sep. 28, 2006

(51) Int. Cl.
*H04N 7/173* (2006.01)
(52) U.S. Cl. .............................. 725/92; 725/50; 725/96
(58) Field of Classification Search ................... 725/50, 725/92, 96
See application file for complete search history.

(56) References Cited

U.S. PATENT DOCUMENTS

| | | | |
|---|---|---|---|
| 5,253,275 A | 10/1993 | Yurt et al. | |
| 5,410,343 A | 4/1995 | Coddington et al. | |
| 5,657,072 A | 8/1997 | Aristides et al. | |
| 5,666,645 A | 9/1997 | Thomas et al. | |
| 5,751,883 A | 5/1998 | Ottesen et al. | |
| 5,790,176 A | 8/1998 | Craig | |
| 6,170,014 B1 | 1/2001 | Darago et al. | |
| 6,263,504 B1 | 7/2001 | Ebisawa | |
| 6,412,112 B1 | 6/2002 | Barrett et al. | |
| 6,505,240 B1 * | 1/2003 | Blumenau | 709/218 |
| 6,701,528 B1 | 3/2004 | Arsenault et al. | |
| 7,039,784 B1 | 5/2006 | Chen et al. | |
| 7,143,089 B2 | 11/2006 | Petras et al. | |
| 7,339,954 B2 | 3/2008 | Futamata | |
| 7,404,201 B2 * | 7/2008 | Takeuchi et al. | 725/109 |
| 2001/0016836 A1 | 8/2001 | Boccon-Gibod et al. | |
| 2004/0083489 A1 * | 4/2004 | Bansal et al. | 725/44 |
| 2004/0128343 A1 | 7/2004 | Mayer | |

(Continued)

OTHER PUBLICATIONS

U.S. Appl. No. 11/611,152, filed Dec. 15, 2006, Ganesan et al.

(Continued)

*Primary Examiner*—Christopher Kelley
*Assistant Examiner*—Charles N Hicks
(74) *Attorney, Agent, or Firm*—Mahamedi Paradice Kreisman LLP

(57) ABSTRACT

Techniques for updating a library with a significant number of titles are disclosed. A library in each of the boxes in service is updated synchronously or asynchronously. Any release to update the library is performed by propagating data chunks by a gossip protocol to all boxes in service. A proper release package is then recovered in each box from the received data chunk to update the library. According to one aspect of the techniques, a small set of seeding boxes is designated to propagate at least some or all of respective received data chunks to a set of the boxes. Each of the set of the boxes is caused to recursively propagate its received data chunks to other boxes chosen to continue spreading, if necessary, some or all of the received data chunks among the boxes till each of the boxes in service has received a designated portion of the data chunks.

28 Claims, 24 Drawing Sheets

U.S. PATENT DOCUMENTS

| | | |
|---|---|---|
| 2004/0266336 A1 | 12/2004 | Patsiokas et al. |
| 2005/0193415 A1 | 9/2005 | Ikeda |
| 2006/0020962 A1 | 1/2006 | Stark et al. |
| 2006/0206609 A1 | 9/2006 | Ganesan et al. |
| 2006/0218218 A1 | 9/2006 | Ganesan et al. |
| 2006/0218220 A1 | 9/2006 | Ganesan et al. |
| 2006/0218605 A1 | 9/2006 | Hirao et al. |
| 2008/0163304 A1* | 7/2008 | Ellis ............................ 725/50 |
| 2008/0263599 A1 | 10/2008 | Knudson et al. |
| 2009/0024846 A1 | 1/2009 | Ganesan et al. |
| 2009/0031424 A1 | 1/2009 | Ganesan et al. |

OTHER PUBLICATIONS

Final Office Action dated Jan. 12, 2009 in U.S. Appl. No. 11/076,343, 11 pgs.

Non-final Office Action dated Apr. 1, 2009 in U.S. Appl. No. 11/351,812, 13 pgs.

Non-Final Office Action dated Feb. 5, 2009 in U.S. Appl. No. 11/611,152, 10 pgs.

Non-Final Office Action dated Feb. 5, 2009 in U.S. Appl. No. 11/076,401, 16 pgs.

Non-Final Office Action dated Dec. 12, 2008 in U.S. Appl. No. 11/076,262, 14 pgs.

Non-Final Office Action dated Jul. 22, 2008 in U.S. Appl. No. 11/076,343, 9 pgs.

* cited by examiner

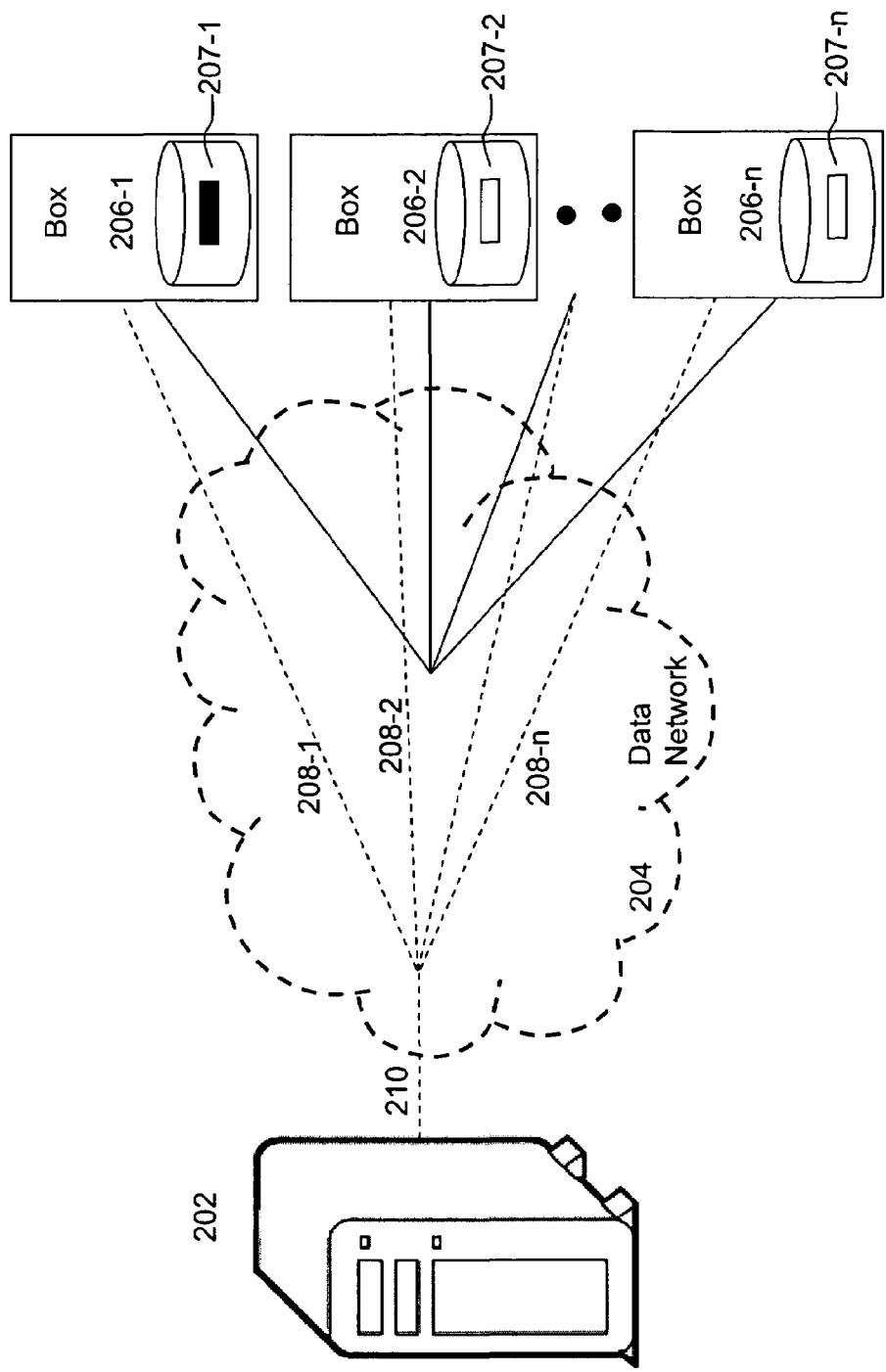

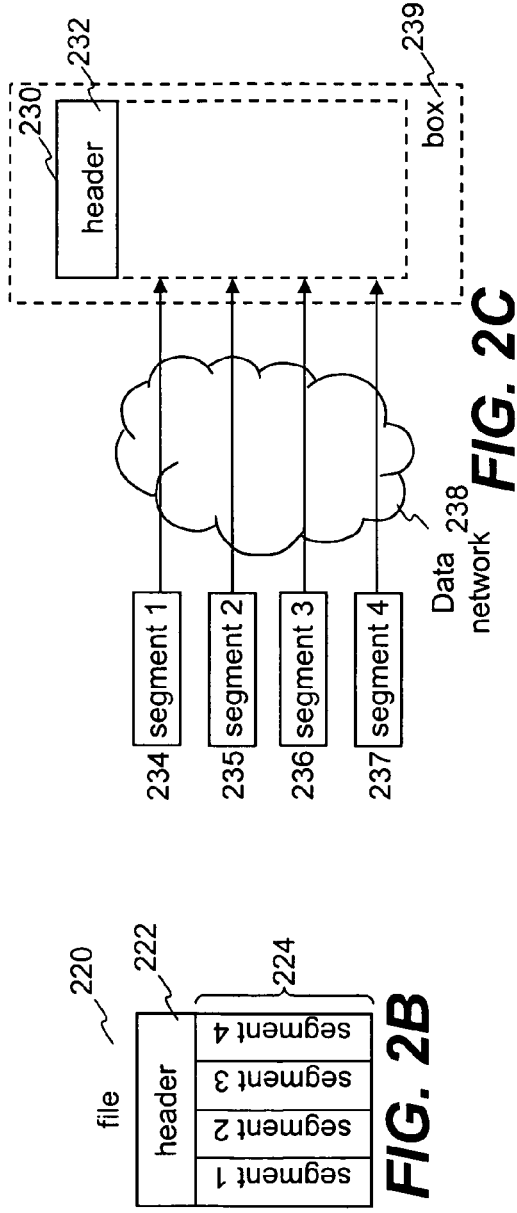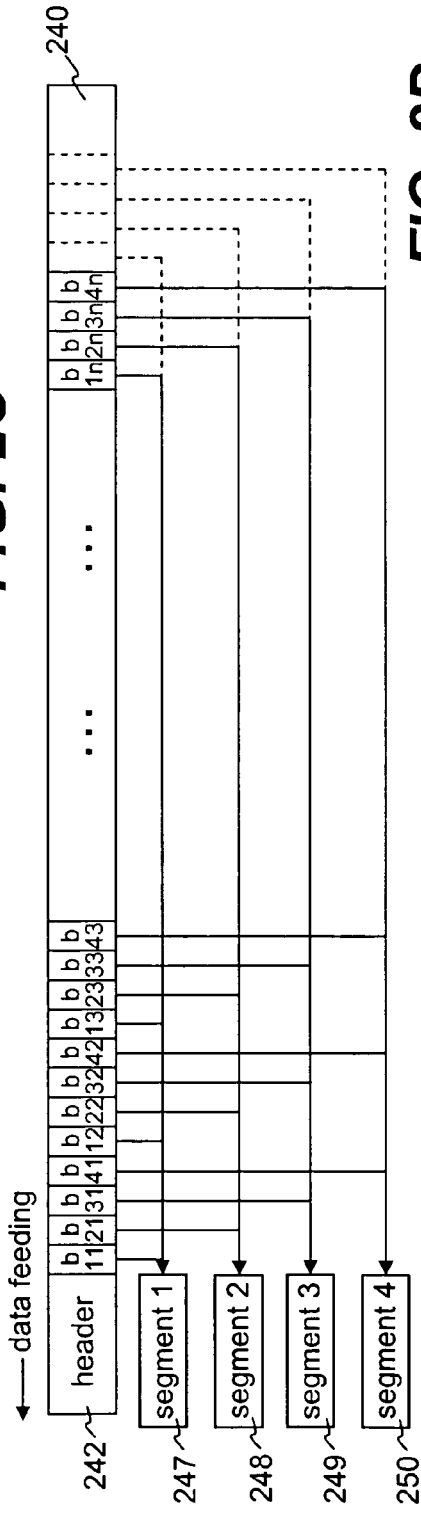

| | box1 | box2 | box3 | box4 |
|---|---|---|---|---|
| seg1 | IPA1 | | | |
| seg2 | | IPA2 | | |
| seg3 | | | IPA3 | |
| seg4 | | | | IPA4 |

FIG. 6C

| Local machine | IP Address | Title (1~5000) | title1 | title2 | ... | title 5000 |
|---|---|---|---|---|---|---|
| Box 1 | address 1 | headers | seg1 seg3 | seg4 | | seg4 |
| Box 2 | address 2 | headers | seg3 seg4 | seg1 | | |
| Box 3 | address 3 | headers | seg2 seg3 | seg4 | | |
| ... | | | | | | |
| Box N | address n | headers | seg1 seg3 | seg3 | | seg1 |

| | box1 | back up | box2 | back up | box3 | back up | box4 | back up |
|---|---|---|---|---|---|---|---|---|
| seg1 | IPA1 | IPA | | | | | | |
| seg2 | | | IPA2 | IPA | | | | |
| seg3 | | | | | IPA3 | IPA | | |
| seg4 | | | | | | | IPA4 | IPA |

FIG. 6D

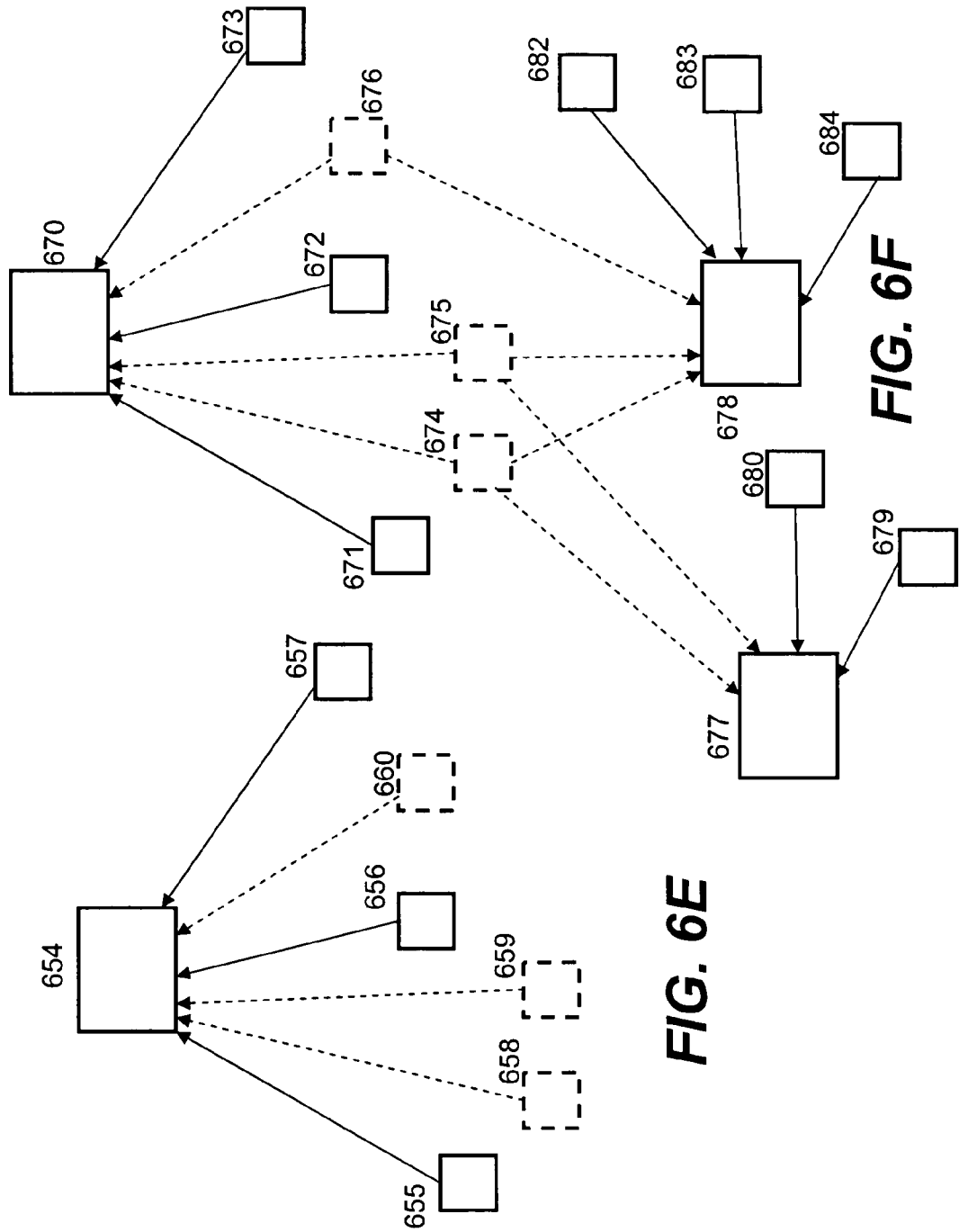

METHOD AND SYSTEM FOR KEEPING A LIBRARY OF TITLES UPDATED

BACKGROUND

1. Technical Field

The present invention is generally related to multimedia delivery over the Internet. Particularly, the present invention is related to techniques, when properly combined, for providing instantaneous media-on-demand (MOD) including services, systems and methods for the same. Further, the present invention is related to techniques for providing a dynamic library of many titles from which a user can select and instantly play back.

2. Description of the Related Art

Whether it is an elder telling a story by the fire or a family sitting in front of the television during dinner, humans have an innate need to hear stories and to be entertained. It is unbelievable how many televisions and/or radios each household has. In fact, it is estimated that every household has 2.3 televisions and that people watch television an average of five (5) hours per day. These statistics and human propensities motivate cable providers, satellite providers, video rental companies, Blockbuster Inc., NetFlix.com, etc. to invest millions of dollars to offer videos, television and movie broadcasts, premium movie channels, pay-per-view, etc. to customers.

Traditionally, each television viewer was satisfied to have four (4) or five (5) television channels offering a few shows and to go to the cinema for more exciting movie content. However, today's audiences have become more demanding, expecting so much more from television at home, including a large variety of more sophisticated dramas, comedies, adventures, horrors, etc. To satisfy this demand, the majority of television viewers subscribe to cable or satellite services, the basic service alone offering significantly more channels and premium broadcasts than regular television.

Still, customers remain unsatisfied. In response, cable and satellite services offer movie channel subscriptions. Each movie channel offers a limited number of relatively new releases of movie broadcasts at pre-selected times. A viewer can review movie lists and movie schedules, and plan to watch selected movies when they are offered. If the viewer turns on the television at the right time, the viewer can watch the movie from the beginning. Otherwise, the viewer may have to watch the movie starting from some other point. Alternatively, the viewer can record movies to watch at times more convenient to the viewer (whether using digital video recorders such as that offered by TiVo Inc. or traditional VCRs). Since the number of movies offered by these movie channels are limited, more disciplined viewers may record all desirable movies currently being provided and have to wait until additional titles come available. Since the number of movies offered on movie channels is limited and since the movies start at irregular times, movie channels do not effectively satisfy current customer demand.

Customer appeal of "video on demand" is well known. Generally, true video on demand can be characterized as instantaneous viewing of a movie (or other content) which may be selected from a list of preferably all movies available. Ideally, a server or set of servers will store all movies, will enable customers to select movies, and will stream the movies to the consumers while the customers view the movies without network interruption. However, given the many shortcomings of today's technology and network-related infrastructure, true video on demand is currently unavailable to the general public. Communication capacity and speed in satellite, cable and DSL networks are insufficient, unreliable, unpredictable and inconsistent. Because of the insufficient and inconsistent communication capacity and speed, if true video on demand were available, viewers on a system of today would have to settle for unwanted pauses and other erratic behavior. True video on demand will likely be unavailable to the general public for many years, available only after faster and significantly more reliable and predictable communication channels (e.g., fiber optics) are deployed and faster computing is developed.

In limited circumstances, true VOD is offered today using specialized, reliable networks capable of delivering and maintaining high capacity and speed. Cable "On Demand" is one such service. On Demand provides the ability to instantly download movies for playback, but only if the user is connected to a high speed digital network and if the service provider can support VOD. This service is not available over traditional broadband connections.

Referring now to FIG. 1, there shows a video delivery system 100 that is used for delivering video services over a network. The video delivery system 100 includes a video server 102 that is sometimes referred to as a head-end. Through a data network 104, the video server 102 can provide continuous, scheduled and video-on-demand (VOD) services to respective client machines 106-1, 106-2, ... 106-n (i.e., its subscribers). Hence, the system 100 is a typical client-server architecture with one server 102 serving a plurality of client machines 106-1, 106-2, ... 106-n. The server 102 is further coupled to a media storage device 112 that may be configured to store various media files (e.g., movies or news footage). The media storage device 112 must be on-line and must store and supply titles scheduled or demanded for delivery to any of the client machines 106-1, 106-2, ... 106-n.

To ensure quality of service (QoS), the bandwidth requirement of the network path (e.g., 108-1, 108-2, ... 108-n) to each of the client machines 106-1, 106-2, ... 106-n has to be sufficient. However, as the number of the subscribers continues to increase, the demand on the bandwidth of the backbone network path 110 increases linearly, and the overall cost of the system 100 increases considerably at the same time. If the server has a fixed bandwidth limit and system support capability, an increase in the number of subscribers beyond a certain threshold will result in slower transfer of data to clients. In other words, the transmission of the video data over the network 104 to the subscribers via the client machines 106-1, 106-2, ... 106-n is no longer guaranteed. When the video data is not received in a client machine on time, the display of the video data may fail or at least become jittery.

To alleviate such loading problem to the video server 102, a video delivery system often employs multiple video servers, perhaps in multiple locations. Each of the video servers, similar to the video server 102, is configured to support a limited number of subscribers. Whenever the number of subscribers goes beyond the capacity of a video server or the bandwidth thereof, an additional video server needs to be deployed or additional bandwidth needs to be allocated. Subsequently, overall costs go up considerably when more subscribers sign up with the video delivery system 100.

As a simple solution to the video-on-demand limitations, cable and satellite providers offer pay-per-view, namely, a limited number of newer releases starting on average every half hour for about the price of a video rental. Even with pay-per-view, a customer has to select a movie from a limited set, and still has to wait until the broadcast begins. Further, in cases where the set-top box does not support two-way communication with the service provider, the customer has to inconveniently telephone a service to order the selected movie. Pay-per-view is a feeble solution to true video on demand.

Several cable and internet companies are considering other alternatives to true video on demand. One of the better alternative systems of today enables a viewer to select, order, download and view a movie. However, because of slow download speeds and considerable movie size, the viewer has to wait significant time, e.g., one (1) to two (2) hours, for the movie to download. Although in many ways better than pay-per-view, this option is still far from ideal. The solution makes customers wait a long time before receiving the movie, fails to give consumers immediate gratification, and fails to take advantage of impulsive nature of many purchasers.

Satellite providers specifically will have difficulty providing true video on demand or current alternatives because satellite communication offers no return path, i.e., offers only one-way communication from the satellite provider to the customer, and because satellite bandwidth which is sufficient for broadcast (i.e. point-to-multipoint) is insufficient for point-to-point communication. At this time, customers have no way to peruse movie options, request a movie, etc. without some two-way mode of communication. Because of the limited capabilities of satellite networks, satellite providers are at a substantial disadvantage to cable providers who can offer cable, internet broadband, voice over IP, and other network services.

Companies such as Blockbuster Inc. and Netflix, Inc. have created business models that attempt to give greater movie options to customers. However, Blockbuster requires customers to get off the sofa, get dressed, go to a hopefully local business establishment, select a movie (which is often unavailable), and return home before being able to start the movie. Netflix allows a customer to order movies from extensive lists, but mails the requested movies using traditional post. Customers have to wait at least several days before a requested movie is received. These two models do not offer anything "on demand."

There, thus, is a great need for an instantaneous VOD system that allows users to select a desired title among a sizable library and view the ordered title instantaneously.

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, embodiments of the invention relate to techniques for providing media services over data networks. The techniques described herein are related to each other and each is believed independently novel in the art. The disclosed techniques may be performed alone or in any combination to provide a novel and unobvious system or a portion of a system. It should be understood that the techniques in combination yield an equally independently novel combination as well, even if combined in their broadest sense; i.e. with less than the specific manner in which each of the techniques has been reduced to practice.

Embodiments of the present invention relate to various techniques for providing media services over data networks. According to one aspect, some of the techniques, when properly combined, can provide an instantaneous media-on-demand system, and process and method for the same. Significantly different from the prior art systems in which media services are rendered at a central server or servers, embodiments of the present invention utilize individual devices on a network to supply each other with needed sources in pieces to render required services. As a result, the loading pressure on a server is distributed into the network.

According to another aspect of the invention, a system provides a library with a significant number of titles from which a user may select and order a title whenever desired and play back the title fairly instantly by accessing a beginning portion of a file pertaining to the title. The beginning portion of data is locally cached while the remaining portion of the data is supplied by other designated devices. The library is updated dynamically with releases (e.g., new or popular titles).

According to still another aspect of the present invention, a file pertaining to a title is fragmented into a header and several tails or segments. The header is a continuous portion of the file while the segments are respective parts of the remaining portion of the file. The header is seeded substantially in all boxes, and none or at least one of the segments are distributed in each of the boxes in service. When a title is ordered, the header is instantly played back while the segments, if not locally available, are streamed in or continuously fetched respectively from other boxes that have the segments. Data from the segments being concurrently fetched is multiplexed together with data from segments cached locally, if any, to recover the remaining portion of the file and continue playback of the title.

According to still another aspect of the present invention, a large file is fragmented intelligently and the segments are so distributed as to best utilize the network bandwidth and maximize quality of service (QoS). The header size and the number of segments are computed or determined periodically in accordance with the required transmission rate of the title, the minimum available network speeds, etc.

According to still another aspect of the present invention, a library in each of the boxes in service is updated synchronously or asynchronously. Any release to update the library is performed by propagating data chunks by a gossip protocol to all boxes in service. A proper release package is then recovered in each box from the received data chunk to update the library. In a case in which a service provider is provided with a high bandwidth broadcasting or multicasting capability, a release fragmented into a header and several segments is transmitted to all boxes that are respectively configured to receive a proper release package to update the library.

According to still another aspect of the present invention, boxes either newly installed or put back onto the network after a period of time are updated efficiently, e.g., in a shortest possible time, to start providing services. An original library in such a box is updated with the most demanded titles first or the least amount of data possible so that the box may be in condition sooner to not only fulfill orders for the most demanded titles but also provide needed data to other boxes. Depending on implementation, the updating of the original library in a box may be carried out by receiving data chunks by a gossip protocol from other boxes that collectively have the latest titles or receiving proper release packages from a service provider via a broadcasting or multicasting infrastructure.

According to still another aspect of the present invention, backup boxes are provided to support boxes designated to provide data to an ordering box such that all data being transported among boxes is not delayed or interrupted. Should one of the boxes providing the data to the ordering box under-perform (e.g., due to operational issues in the box or undesirable network performance), a backup box may be launched to replace or assist the underperforming box and to continue the supply of data to the ordering box. Other aspects of the invention will become apparent and appreciated by those skilled in the art from the detailed description herein.

Embodiments of the invention may be implemented in numerous ways, including a method, system, device, or a computer readable medium. Several embodiments of the invention are discussed below. In one embodiment, the invention provides a method for providing media-on-demand services over a network, the method comprises receiving a request from an ordering box, the request including an order of a title in a library; and identifying one or more boxes to provide distributed objects pertaining to the title to the ordering box, wherein the ordering box proceeds with a playback of a residing object pertaining the title while downloading the distributed objects from the one or more boxes.

In another embodiment, the invention provides a method for providing a viewing mechanism of all titles in a library in a box. The method comprises enabling selection of a title from a library of titles in a box, generating a request when one of the titles is selected, the request including title information, transmitting the request over a network to a server configured to formulate a response, the response including source information identifying one or more boxes to provide one or more distributed objects pertaining to the ordered title, initiating a playback of a residing object in the box pertaining to the ordered title, receiving the one or more distributed objects from the one or more boxes as one or more streams of data, a portion of which is received during playback of the residing object, and initiating a playback of the one or more streams of data together with any residing objects pertaining to the ordered title, if any, as soon as the playback of the residing object is finished.

In still another embodiment, the invention provides a system for providing media-on-demand services over a network. The system comprises a plurality of boxes, respectively coupled to a network, each box associated with a user and providing a library of titles, each of the boxes including a storage space allowing a plurality of headers and a plurality of segments to reside therein, each of the boxes configured to provide a request including title selection information; and a server coupled to the network and configured to provide a response to a request from one of the boxes ("an ordering box" hereafter), the response including source information identifying a set of the boxes designed to provide respective distributed segments pertaining to the title to the ordering box, wherein, in responding to the response, the ordering box initiates playback of the header pertaining to the selected title while downloading one or more distributed segments from the set of the boxes.

In still another embodiment, the invention provides a system for managing objects distributed in a network. The system comprises a plurality of boxes, respectively coupled to the network, each associated with a user and providing a library of titles, each of the titles represented by a header and a number of segments, each of the boxes including a storage space to locally cache the header, and none, or one or more of the segments for each of the titles; and a computing device configured to provide a response after receiving a request from one of the boxes ("an ordering box" hereinafter), the request including an order of one of the titles, the response including source information identifying a set of supplying boxes that are designated to provide missing segments pertaining to the title, if not all of the segments are locally cached in the ordering box. In general, the library is partitioned into a number of groups or bands, one of the bands (a "top band" hereinafter) including some of the titles that are most demanded, and another one of the bands (a "low band" hereinafter) including some of the titles that are least demanded. In one case, the number of segments for the titles in the top band is greater than the number of segments for the titles in the low band, leading to more distributed copies for each of the titles in the top band than for titles in the low band.

In still another embodiment, the invention provides a method for fragmenting a file pertaining to a title, the method comprising: dividing the file into a sequence of data blocks, the sequence of data blocks partitioned into a first portion and a second portion; forming a header from the data blocks in the first portion, the data blocks in the header being consecutive; and forming N segments, each of the N segments including some of the data blocks in the second portion, with the data blocks in each of the N segments being nonconsecutive, wherein N is a finite integer greater than 1. The file is a collection of data together with auxiliary data, if there is such auxiliary data. The header is locally cached in each box in service as a residing object, and M of the N segments are stored in a box, wherein the value of M differs from title to title and box to box, and $0 \leqq M \leqq N$.

In still another embodiment, the invention provides a method for keeping a library dynamically updated. The method comprises dividing a file pertaining to a title into a sequence of data chunks, wherein the title is included in a release to update the library in each box in service, designating an initial set of seeding boxes to receive the data chunks collectively, each of the seeding boxes receiving at least some of the data chunks, and causing each of the seeding boxes to propagate at least some or all of the received data chunks to a set of the boxes, wherein each of the set of the boxes is caused to recursively propagate its received data chunks to other boxes chosen to continue spreading of some or all of the received data chunks among the boxes till each of the boxes in service has received a designated portion of the data chunks. Essentially, each box receives what it is designated to receive. The method further comprises causing each of the boxes to recover the header and none, or one or more of the segments from the some or all of the received data chunks, and subsequently updating the library therein.

In still another embodiment, the invention provides a method for updating contents in newly installed devices, the method comprises determining a number of outdated titles in a library when a box newly present in a system offering media services is detected; determining a corresponding number of missing titles to add into the library and to retire the outdated titles from the library; causing the box to initially retrieve data pertaining to relatively new titles in the set of missing titles so that the box is ready for servicing an order of one of the relatively new titles; and keeping the box retrieving data pertaining to the remaining missing titles till the box is fully updated. In one case, the box retrieves a header for each of the relatively new titles, and then retrieves one of several segments for each of them. In another case, the box retrieves a header and one of several segments for each of the relatively new titles in an order of declining popularity of the titles.

In still another embodiment, the invention provides a method for transporting data in a distributed environment. The method comprises determining whether a communication session has been established with each of boxes designated to supply needed data segments in accordance with source information provided by a computing device over a network, and downloading concurrently the needed data segments respectively from the designated boxes only after the communication session has been successfully established with each of the designated boxes, wherein each of the needed data segments includes a plurality of data blocks sampled from a sequence of data blocks representing a file.

In yet another embodiment, the invention provides a method for keeping a library dynamically updated, the method comprises preparing a release in a data package, the release including at least a title to update the library; and transmitting the data package via a transmission infrastructure to boxes in service, wherein each of the boxes is configured to locally cache at least a portion of the data package, and not every one of the boxes caches an identical portion of the data package. Depending on implementation, the transmission infrastructure may be capable of broadcasting or multicasting. The data package includes a header and several segments for the title. The portion of the data package locally cached in the each of the boxes includes the header and none, or one or more of the segments. Alternatively, the data package includes a plurality of release packages, each including the header and none, or one or more of the segments.

Accordingly one of the objects of the present inventions is to provide techniques that, when combined properly, can be used effectively to provide an Instantaneous media-on-demand system.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 2A shows a configuration of a distributed network system, in accordance with an embodiment of the present invention;

FIG. 2B, according to one embodiment, shows a file organized or fragmented into a header and four segments;

FIG. 2C shows a file pertaining to a title comprising one header and four segments, assuming a situation in which a box locally stores the header and receives the four segments from four other boxes to continue a playback of the title;

FIG. 2D shows a data stream representing a file, a beginning portion of which being allocated as a header and a remaining portion being decimated into four individual segments;

FIG. 6B shows an exemplary map illustrating how a library of 5000 titles is distributed across N boxes;

FIG. 6C shows example source information as a table including an IP address (e.g., IPA1) for each of the four boxes that are designated to supply segments for an ordered title;

FIG. 6D shows exemplary source information with backup boxes in a table that includes a backup identifier (shown as an IP address) for each of the designated boxes;

FIG. 6E shows one embodiment in which an ordering box is being supported by three designated boxes, from which three respective segments pertaining to an ordered title are respectively provided to the ordering box, wherein the three designated boxes are respectively backed up by three other boxes;

FIG. 6F shows another embodiment in which an ordering box is being supported by three designated boxes, wherein the three designated boxes are respectively backed up by three other boxes that at the same time backup other designated boxes supporting other ordering boxes;

DETAILED DESCRIPTION OF THE INVENTION

Figure 1:
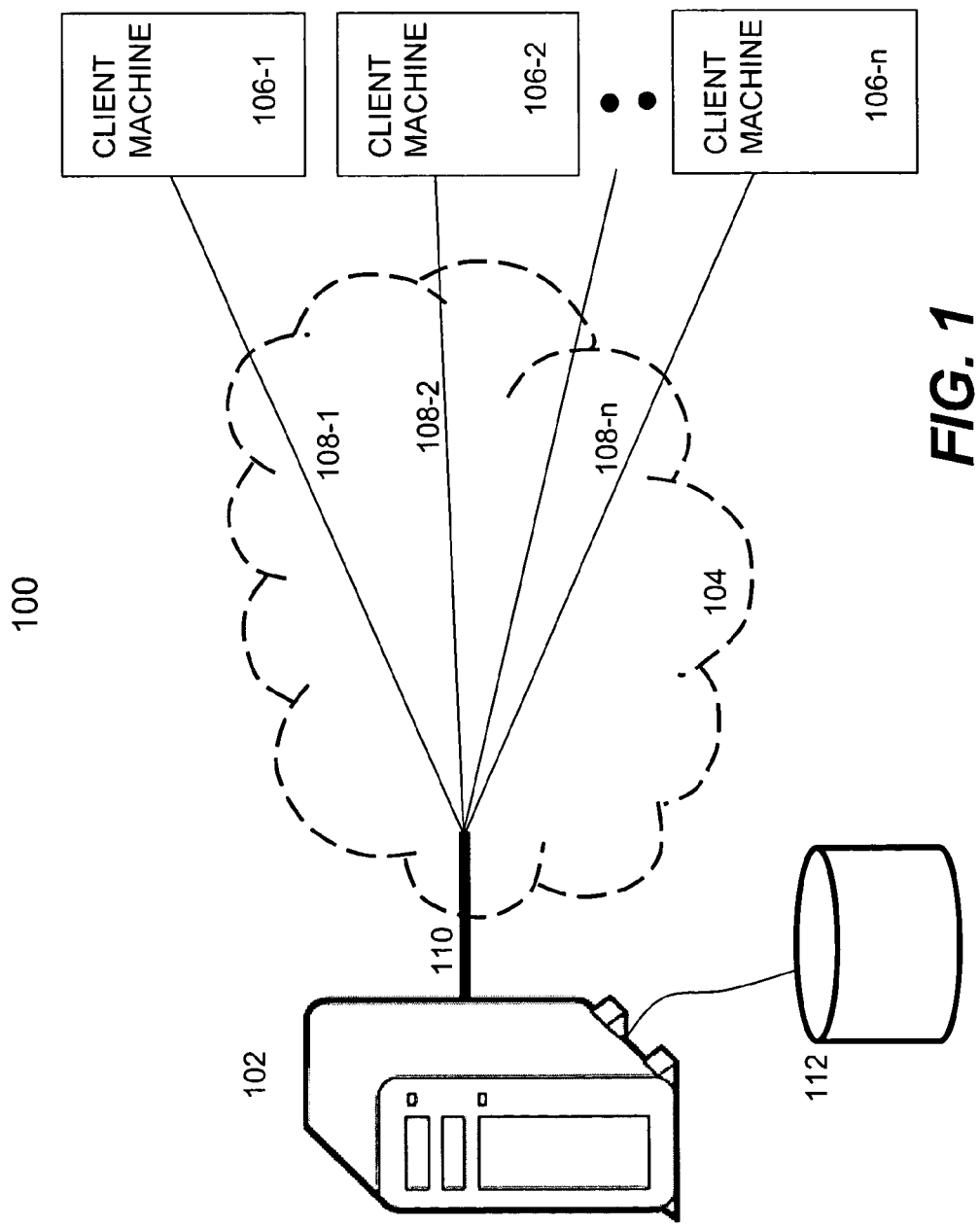
FIG. 1 shows a video delivery system that is commonly used for delivering video services over a network, also referred to as a server-and-client architecture.

Embodiments of the invention relate to various techniques for providing media services over data networks. Some of the techniques, when properly combined, may provide instantaneous media-on-demand. One embodiment may provide a dynamic library with a significant number of titles from which a user can select and order for playback fairly instantly. To facilitate instant playback, a file pertaining to a title may be fragmented into a header and several segments (a.k.a., tails). In one embodiment, the header is seeded in all boxes and the segments are distributed within the network to the boxes according to a scheme. When a title is ordered, the header can be instantly played back while the segments, if not locally available, can be streamed in from supporting boxes. Data from the segments being concurrently fetched can be multiplexed with locally cached segments, if any, to recover the remaining portion of the file and continue playback of the ordered title.

In addition, in one embodiment, a library in each of the boxes in service may be updated synchronously or asynchronously by propagating data chunks, e.g., using a gossip protocol, to all boxes in service. Any boxes that are either newly installed or put back in the system after a period of time can be updated in a short time to start providing services. Other possible features, benefits and advantages of the invention will become apparent from the following detailed description taken in conjunction with the accompanying drawings which illustrate, by way of example, the principles of the invention.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

For convenience, definitions for some terms are provided below. It should be noted that the definitions are to facilitate the understanding and description of the present invention according to one embodiment. The definitions may appear to include limitations with respect to the embodiment. However, the actual meaning of the terms may have applicability beyond such embodiment.

Media or video—used interchangeably herein, indicates multimedia data, a collection of which with other possible auxiliary data is referred to as a file. Because such a file is typically large in size, it is often compressed for storage or transmission in accordance with a commonly used standard (e.g., H.264, MPEG-1, MPEG-2, or MPEG-4). Examples of a video may include, but are not limited to, movies, games, footage, a collection of documentary or multimedia data.

Local device, computer, machine or, simply, box—used interchangeably herein, is a computing device typically used by a user to access a media file. Such a client machine may operate independently or with another device. Examples of the client machine include a set-top box, a computing device (such as a desktop, a laptop, a PDA, a telephone, a tablet PC, etc.), a television with network capability and a network storage device.

Residing object and distributed object are relative terms. When a file is divided into several pieces or segments, some of the segments may be distributed remotely in other boxes. These distributed segments are referred to as "distributed objects." The header and other segments cached locally are referred to as "residing objects" or "resident objects."

Server, server device, server computer, or server machine—used interchangeably herein, is a computing device, typically located remotely from local boxes. Depending on implementation, a server herein may mean a stand-alone computer or a cluster of two or more computers configured to deliver the server operations described herein.

Embodiments of the present invention are discussed herein with reference to FIGS. 2A-8. However, those skilled in the art will readily appreciate that the detailed description given herein with respect to these figures is for explanatory purposes only as the invention extends beyond these limited embodiments.

One embodiment of the present invention is related to a technique for delivering video services over a data network that is not adversely affected by a growing number of users. In one embodiment, the more users there are, the better the performance delivered by the system or process.

FIG. 2A shows an exemplary configuration 200 of a distributed network system 100, in accordance with an embodiment of the present invention. It will be appreciated that the entire network may comprise multiple of such network systems 100, for example, one for each box of a particular type, size, content, etc.

A server 202, presumably managed and/or populated by a service provider, is configured to handle the delivery of video (or multimedia) services to users via local machines or boxes 206-1, 206-2, . . . 206-n. Different from the video server 102 of FIG. 1 that delivers video data to a subscriber upon receiving a request therefrom, the server 202 is not responsible for delivering the content in response to a request from a user, and instead is configured to provide source information as to where and how to retrieve at least some of the content from other boxes. In other words, the server 102 of FIG. 1 requires the media storage device 112 to provide the content when any of the client machines 106-1, 106-2, . . . 106-n is being serviced, while the server 202 does not need a media storage device to provide the content. Instead, some of the boxes 206-1, 206-2, . . . 206-n are respectively configured to supply part or all of the content to each other.

According to one embodiment, when fulfilling a request from a local machine or a box (e.g., 206-1), communication between the server 202 and the box 206-1 over the network paths 208-1 and 210 may be limited to small-scale requests and responses (e.g., of small size and very short). A server response to a request from a box may include source information (e.g., identifiers), authorization information and security information. Using the response from the server 202, the box may be activated to begin playback of a title (e.g., 207-1). Substantially at the same time, the box may initiate one or more requests to other boxes (e.g., 206-2 and 206-n) in accordance with the source identifiers to request subsequent portions of the title (e.g., 207-2 and 207-n). Assuming proper authorization, the requesting box receives the subsequent portions of the data concurrently from the other boxes. Because of box-to-box communication of content, the bandwidth requirement for box-to-server communications over the network paths 208-1 and 210 is kept low and typically short in duration. In the event there are a large number of user boxes issuing playback requests substantially at the same time, the bandwidth of the backbone path 210 should be sufficient to avoid noticeable or burdensome delay.

The contents available in a library offered in any of the boxes 206-1, 206-2, . . . 206-n are originally provided by one or more content providers. Examples of the content providers include satellite receivers, television relay stations, analog or digital broadcasting station, movie studios and Internet sites. Depending on implementation, the contents may be initially received or originated in the server 202. Instead of maintaining and managing the content in a large storage device, the server 202 is configured to distribute the content or files to a plurality of local machines registered with the server 202. The boxes 206-1, 206-2, ... 206-n shown in FIG. 2A are examples of local machines in service. Unless there is a need for a backup copy, the server 202 at any time has no need to keep a copy of the content. On the other hand, unless there is a special need to keep a complete copy of an extremely high-demand title in a box, none of the boxes in service has a complete copy of a title until an order is placed. Consequently, with embedded security in the distributed objects, some embodiments of the present invention may alleviate the concern of electronic piracy and widespread distribution (e.g., by hacking or illegal duplication).

For convenience, it is assumed herein that a file pertaining to a title is played back when the title is selected and ordered by a user. When an order for a title is placed, a corresponding file must be available for playback. Embodiments may enable a file, or at least a portion thereof, regardless of its size, to be accessed instantaneously. According to another embodiment, where a file is 840 Mbytes on average and a box includes a storage capacity of 300 Gbytes, a system may offer a large library of titles (e.g., 5000) for access at any time instantly. In the prior art, if the files for the titles must be stored in advance to offer instantaneous playback, the local storage of a box would have to have a capacity of 4,000 Gbytes, consequently, rendering instantaneous VOD economically impractical.

According to one embodiment of the present invention, only a beginning portion (referred to as a "header") and possibly one or more tail segments of a file are locally cached in a box. Such locally cached segments are referred to as residing objects, while segments not residing locally are referred to as distributed objects. When a title is selected, the header of the corresponding file is instantly played back. During the time the header is being played, the distributed objects corresponding to the title are retrieved simultaneously from other boxes. When the header is finished, the received parts of the distributed objects being streamed in from other boxes is combined with residing objects for the title, if any, to enable continuous playback. Depending on the popularity and concurrent demand for a particular title, the number of residing objects may be increased or decreased to control the dependency of each box on other boxes for playback. Typically, the more residing objects for a title a box has, the more distributed copies of the title there are in the entire system and thus the less dependency of the ordering box on the other boxes.

In one embodiment, the header is always played first to ensure instant playback. However, when a box has more than one residing object for the file, the residing objects other than the header (a.k.a., resident segments) will be played together with the distributed objects (a.k.a., distributed segments) being downloaded or fetched from the other boxes. These resident and distributed segments are collectively referred to as "segments" of a file.

For example, in FIG. 2A, when a user selects a title for playback from a box 206-1, a header 207-1 of the corresponding file residing in the box 206-1 is instantly accessed (provided that the user has been authenticated and/or payment is settled). In this example, there may be four segments for the video file, two of which are distributed in other boxes (e.g., 206-2 and 206-n). During the playback of the header, two distributed segments are downloaded from the other two boxes and locally buffered with the resident segments as continuing content. When the header is done, the continuing content is played back. As a result, instantaneous VOD may be realized.

Referring to the embodiment of FIG. 2B, a file 220 is organized or fragmented in terms of a header portion 222 and a tail portion comprising four segments 224. In general, the file 220 may be divided into any number of header and segment portions in consideration of a required transmission rate (e.g., related to the encoding and decoding rates for successful playback), and the minimum uploading and downloading capabilities of a network. According to one embodiment, given a required transmission rate (e.g., 1 megabit per second or 1 Mbps), the minimum uploading and downloading speeds of a network are considered to determine a number that defines the segmentation, and thus the dependency on other boxes and the support for concurrent demands of a particular title. It is assumed that a minimum uploading speed is U and a required transmission rate is D, and $D/U=K<k$, where k is the smallest integer greater than K. In one embodiment, a file is preferably divided into a header and k segments to optimally utilize the uploading speed of U, assuming that the downloading speed is at least k times faster than the uploading speed. For example, in a POTS-based DSL network for residential areas, the required transmission is about 1.0 Mbps while the uploading speed is about 320 kbps. Hence, k=4.

As shown in FIG. 2C, a file 230 comprises one header 232 and four segments 234-237. FIG. 2C assumes a situation in which a local box stores only the header 232 and depends on four other boxes to supply the four segments 234-237. Assuming that the local box 239 has a downloading speed four times the uploading speed of the other boxes, while the header 232 is being played back, the four segments can be downloaded concurrently across the network 238 as streaming into the local box 239 around the same time.

As also shown in FIG. 2B, a header 232 is the beginning portion of a file while each segment is a decimated portion of the remainder of the file. In this embodiment, the data in the header is continuous, meaning the header itself can be played back (e.g., the first 15 minutes of the title), while the segment portions 234-237 must be present together before the tail portion of the file can be played. FIG. 2D shows a data stream 240 representing a file. The beginning portion of the file 240 is allocated as a header 242 and the remaining portion is divided into four "vertical" segments 247-250. The segments 247-250 are created or formed by respectively sampling, in a decimated manner, the remaining portion of the file.

Depending on an exact data length of the remaining portion, the n-th data block in each of the segments 247-250 is four successive data blocks in the remaining portion of the file. In one embodiment, a data block comprises a chunk of data, for example, 256 Kbytes or 1 Mbyte. As shown in FIG. 2D, the remaining portion of the data stream 240 is expressed in data blocks as follows: $b11, b21, b31, b41, b12, b22, b32, b42, b13, b23, b33, b43, \ldots b1n, b2n, b3n, b4n$. With the decimated sampling, the four segments 247-250 obtained from the remaining portion can be respectively expressed as follows:

Segment 1=$\{b11, b12, b13, b14 \ldots\}$;

Segment 2=$\{b21, b22, b23, b24 \ldots\}$;

Segment 3=$\{b31, b32, b33, b34 \ldots\}$; and

Segment 4=$\{b41, b42, b43, b44 \ldots\}$.

FIG. 2D shows one exemplary embodiment of fragmenting a file into a header 242 and four segments 247-250. There can be other ways to fragment a file. For example, besides fragmenting a file into several "vertical" segments representing a tail portion of a file, one or more segments may be allocated to represent audio portions of the file. Typically, a movie includes several audio tracks, each for a language (e.g., English, French or Spanish). As a result, all segments are not necessarily equal in length but need to be available at the same time to support playback. This particular example illustrates that not all segments for a title must be fetched to play back the title (e.g., all segments for the video data and only one segment for one selected audio track). In another example, the file 220 can be segmented in terms of red, green, blue, and brightness values. Thus, an image can be generated even if one of the segments is missing. Of course, forming an image from red, green and brightness alone may compromise image quality. In such a case, colors may have to be estimated, possibly based on prior frames or other criteria. In general, different files may be fragmented into different numbers of segments.

Figure 2E:
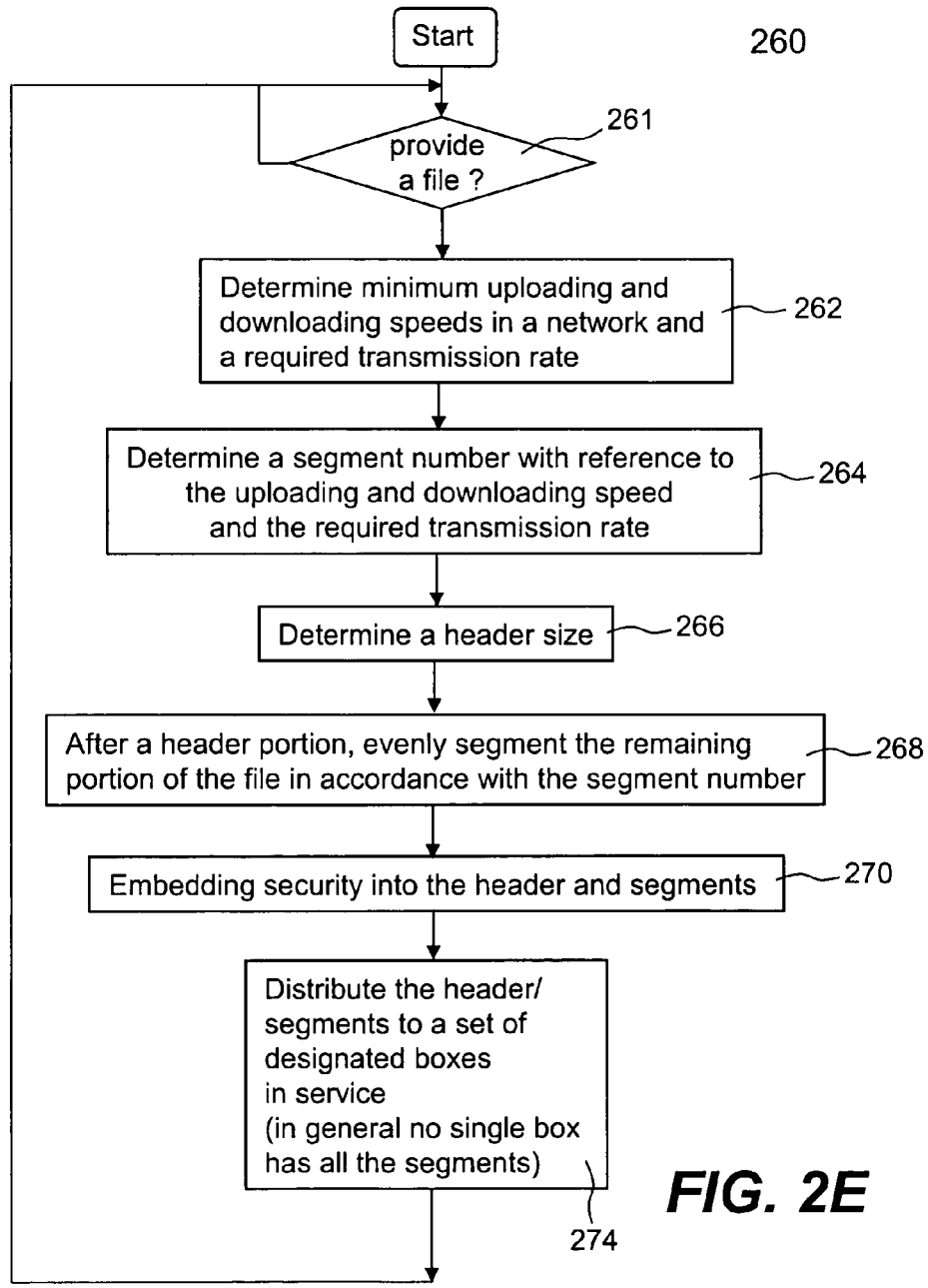
FIG. 2E shows a flowchart or process of, in accordance with one embodiment, fragmenting a file for distribution to a plurality of boxes.

FIG. 2E shows a flowchart or process 260 of fragmenting a file for distribution to a plurality of boxes. The process 260 may be implemented as a method, a process, and/or a system, or in software, hardware or a combination of both. At 261, the process 260 awaits a file to be fragmented for distribution to boxes. When such a file becomes available, at 262, minimum uploading and downloading speeds for a network as well as a required transmission rate are obtained. In general, different networks could have different speeds. Although it is not required to have the network uploading and downloading speeds to dictate a number of fragments for the file, the knowledge of such speeds in view of the required transmission rate of the file enables the file to be fragmented to make efficient use of the network speeds (or bandwidths).

At 264, the number of segments k for a file is determined with reference to a number of factors including the minimum uploading and downloading speeds obtained from 262 and a required transmission rate of data for proper display (e.g., 1 Mbit per second). In one embodiment, the actual number of segments is chosen slightly greater than k, for example k+1, provided the downloading bandwidth is sufficient (greater than the required transmission data rate). The extra segment, as will be further described below, may provide extra time to stabilize or overcome network or box instabilities.

The size of a file header is determined at 266. In general, a larger header size results in fewer available titles in a library. In one embodiment, the header size is determined to last just long enough to assure receiving and playing the remaining portion (in the distributed objects) in a continuous fashion or, perhaps, may include some extra time for synchronizing the objects respectively being fetched and to manage instabilities. In another embodiment, the header size is automatically calculated as a function of a number of parameters such as the minimum network speeds in an area being serviced, and scenes that may be translated to a higher transmission rate. In still another embodiment, a header is used as a carrier to transport other information to boxes, for example, security information, and short footage of commercial information.

Not shown in FIG. 2E is an option to secure the file in its entirety. In one embodiment, the file is scrambled in accordance with an encryption scheme or by a cipher to protect the content therein, wherein the header may be independently deciphered before playback. Regardless of whether the file is encrypted or clear, it can be fragmented as is. Once the header size is determined at 266, the header portion is readily created. At the same time, the remaining portion of the file is decimated into k segments. In another embodiment, the header and none, one or more of the k segments are distributed to each box in service. The details of determining which box is to receive the segments will be described below. In any case, the header and the segments may be secured before distribution. At 270, a certain type of security may be embedded into the header and the segments. Depending on implementation, the header and the segments may be respectively encrypted in accordance with an encryption scheme or a cipher (e.g., Data Encryption Standard algorithm, Blowfish block cipher, Twofish cipher and RC-4) and/or protected by digital rights management (DRM).

At 274, the header and the segments (i.e., respective packages) are distributed to each box in service. According to one embodiment of the present invention, the distribution is performed synchronously or asynchronously by propagating the respective packages as chunks of data from boxes to boxes, the details of which are described below. A box may be selected to receive one, more or possibly all of the segments. After 274, the process 260 goes back to 261 for another file.

One embodiment may enable a dynamically updated library with a large number of titles offered to users. Each of the titles may be selected and ordered for instant playback. Given a large library, for example, of 5000 titles that are updated periodically (e.g., daily) and can be accessed anytime instantly, some of the titles may be more popular and thus demanded more often and by more users than others. To minimize possible bandwidth problems or unavailability of boxes for sourcing popular titles, the seeding of residing objects and distributed objects should be performed intelligently, e.g., according to popularity, geography, demographics, and/or like criteria.

Figure 3A:
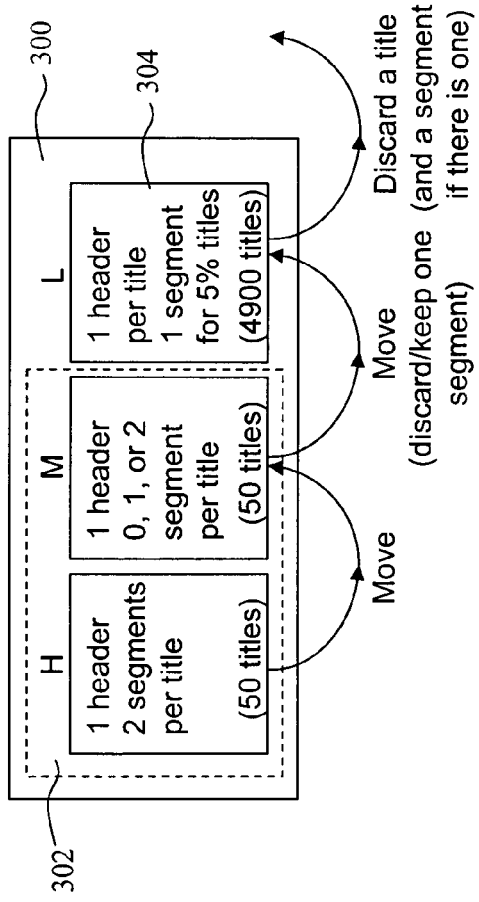
FIG. 3A shows one exemplary popularity classification of titles in a library within a limited storage space in a box.

FIG. 3A shows one exemplary popularity classification of titles in a library in a limited storage space 300 in a box. For convenience, it is assumed that the storage space 300 has a capacity of 300 Gbytes and that there are 5000 titles available for instant playback. Any of the 5000 titles may be selected and instantly accessed for playback. For a VOD application, each movie on average is assumed to be about two hours. For display quality acceptable to most users, a file for a two hour movie is about 840 Mbytes in size. For a header of about 30 Mbytes, each of the four segments, assuming each file's size is close to the average, must therefore be about 203 Mbytes (i.e., (840 Mbytes−30 Mbytes)×¼). Thus, the storage space 300 must be about 240 Gbytes (i.e., 5000 titles×30 Mbytes+50 titles×2 segments×203 Mbytes+50 titles×2 segments×203 Mbytes+4900 titles×5% of the segments×203 Mbytes=240 Gbytes) to accommodate the 5000 titles for a distribution as shown in FIG. 3A.

According to the embodiment of FIG. 3A, the 5000 titles are divided into two bands, a top band 302 for those newly released or more popular titles and a low (L) band 304 for those relatively less popular titles but still demanded from time to time (e.g., "007: James Bond" or Disney movies for minors). If a library has 5000 titles, the top band 302 may be allocated to accommodate 100 titles, and the low band 304 may be allocated to accommodate the remaining 4900 titles. As new titles are released and added into the top band, the titles already in the top band 302 are either discarded or moved to the lower band 304. In another embodiment, the top band may further be divided into two bands, a high (H) band for the latest, for example, 50 titles and a medium (M) band for the next 50 slightly older titles.

The allocation of an M band facilitates flexible management of the titles in the top band. It is estimated that over 70% of revenues in a movie rental business come from the titles in the top band and over 40% of the revenues from the titles in the H band. As will be further described below, the number of segments for titles in the M band may be reduced or only a percentage of the titles in the M band may be cached with one or more segments, so as to allocate more resources to update the titles in the H band quickly or reduce the dependency of the titles in the H band on other boxes.

In this embodiment, there are 50, 50 and 4900 titles, respectively, in the H, M, and L bands. In general, when a box has been in service long enough, each title in the top band 302 is seeded with a header and one or two corresponding segments, and each title in the L band is seeded with a header and some of the segments. As far as the number of segments per each title in the L band is concerned, only a percentage of the titles therein are seeded with one segment per each title, and those titles are typically different from one box to other box. Because the demand for a title in the top band 302 is much higher than those in the L band 304, the percentage of segments in a box for titles in the L band may be set at a relatively small number, for example, 5%. The distribution of the segments for the titles in the L band is made in such a way that there is always at least one distributed copy of these titles in the system and more distributed segments of titles in the top band. From another perspective, if a title in the top band 302 is selected, there are more boxes that may be designated to supply the distributed segments to support the playback of the title in the ordering box, thus reducing the possibility that other boxes would be unavailable to supply the missing segments. If a title in the low band is selected, because of the relatively low popularity, it is likely that there will be sufficient distributed copies available in the network so that other boxes can be designated to supply the respective segments for playback.

In operation, when a title in the H band is selected in a box, two of its segments already reside in the box. Thus, only two other boxes are needed to feed the two missing segments (i.e., dependency=2). When a title in the L band is selected, in many cases, four other boxes are needed to feed the four segments (i.e., dependency=4). In other words, the popularity of a title determines the dependency of an ordering box on others. The more popular a title is, the less dependent the ordering box is on others.

As described above, a library is updated periodically (e.g., daily or weekly). Every time, a new title is received, the new title is typically added into the H band. In one embodiment, it is desirable to maintain a relatively fixed number of titles in the H, M and L bands, the relatively least popular title in the H band is moved to the M band while the oldest title or relatively least popular title in the M band is moved to the L band. On the other hand, it is possible, although rare, that a title in the L band or the M band is promoted to a higher band. Whenever a title is retired from the M band to the L band, the oldest or relatively least popular title in the L band may be discarded. In accordance with FIG. 3A, whenever a title is moved from the top band 302 to the L band 304, one or both segments from the top band 302 may be dropped depending on whether the title falls in the percentage that is designated to maintain one segment.

In general, there is more than one title released in a day to update a library. However, not all of the titles are necessarily new titles (i.e., for the top band), some being very popular and others being less popular. For example, a library may be updated with ten titles in a day, one newly released title in the top band and nine less popular titles in the L band. When the title is added to the top band, two corresponding segments are also added, and at the same time, a relatively old title from the top band (e.g., likely from the M band) may be discarded or moved to the L band. The relatively old title from the M band may be combined with the nine titles to be determined whether any of these ten titles fall into the percentage (e.g., 5%) for which one segment is supposed to be cached locally for a particular box.

In the embodiment, each box caches 5000 headers (possibly identical, possibly different, e.g., in size, possibly different in format, possibly different in security used, etc.), one per available title. These residing objects ensure that a user can begin playback instantly when a title is ordered and can continue playback long enough to start receiving the distributed objects from other boxes. To facilitate the description of the distribution of segments, the four segments are labeled respectively as 1, 2, 3 and 4. For titles in the top band 302, there are two segments distributed locally and two segments distributed in other two boxes. As a result, there are six possible combinations of locally stored segments: (segment 1, segment 2), (segment 1, segment 3), (segment 1, segment 4), (segment 2, segment 3), (segment 2, segment 4), (segment 3, segment 4). These combinations are distributed fairly evenly among the boxes in service. If an ordering box has segment 1 and segment 2, a first other box and a second other box need to be called upon to provide segment 3 and segment 4, respectively, to the ordering box. Any box that has either segment 3 or segment 4 may be the first or the second other box. For example, a box with (segment 1, segment 3) and another box with (segment 1, segment 4) may be the first and second other boxes, respectively.

In one embodiment, boxes are classified into types. For example, there are six types of boxes, each designated for storage of one of the six combinations provided above. If there are 50 titles in the H band, besides a corresponding header in each of the boxes, the segments for each of the 50 titles are distributed according to one of the six combinations.

For titles in the L band, each box stores one segment of 5% of the titles. When one of the titles in the L band is ordered, that box may or may not have a segment cached locally. Accordingly, the distribution of the segments for the titles in the L band must ensure that boxes in service collectively have all segments for all the titles. In other words, there must be at least one copy in the network of each title in the L band.

There are a number of ways to distribute the segments for titles in the L band among the boxes in service. According to one embodiment, to facilitate the management of the distribution of the segments for the titles in the L band, the distribution of segments for titles in the H band is referenced. For example, when segment 1 and segment 2 for a title in the H band are stored locally, either segment 1 or segment 2 for a title in the L band will be stored locally (since the box need only discard one of the segments when retiring a title from the top band to the low band). Accordingly, the following management of the distribution holds:

| Store locally for a title in the L band | If segments for titles in the H band are |
| --- | --- |
| segment 1 or 2 | segment 1 and 2 |
| segment 1 or 3 | segment 1 and 3 |
| segment 1 or 4 | segment 1 and 4 |
| segment 2 or 3 | segment 2 and 3 |
| segment 2 or 4 | segment 2 and 4 |
| segment 3 or 4 | segment 3 and 4 |

The determination of which titles in the L band fall into the selected percentage for a particular box may be determined based on a number of factors. In one embodiment, the percentage is determined as a potentially randomized function of the ages or popularity of the titles. In another embodiment, the percentage is determined based on statistics of viewing behavior and a preferred language in an area or other measures that may facilitate the retrieval of distributed objects from other boxes more efficiently. In still another embodiment, the percentage is determined from a learning engine that may be embedded in a box dynamically recording some or all of the following exemplary list:

1. the set of programs (e.g., movies) a user has been watching so far from the box;
2. the programs that user has rated (e.g., on a scale of 1 to 10) on the box;
3. the programs on a wish list created by the user for future watching; and
4. browsing activities (e.g., trailers the user has watched and the time the user has spent on reading a brief introduction for a title).

The learning engine may be activated to provide statistics to suggest which programs, e.g., movies are similar to the ones the user has watched (e.g., with respect to actors, directors, or genres). Accordingly, these movies are chosen to be among the percentage of the titles to have the corresponding segments. In addition, the determination of which pairs of movies are similar may be made based on what is referred to as "collaborative filtering", namely, if many users like to watch a pair of movies, then the two movies may be considered similar. Thus, additional movies similar to those likely selected and ordered in the box may be added to the percentage of titles as well. In any case, a box may cache segments pertaining to titles that are more likely going to be selected and ordered by a user via the box. In another embodiment, each movie may be defined by certain attributes. User behavior may suggest user preferences of certain attributes. By matching preferred attributes to movie attributes, the learning engine may determine which segments for I band titles to store in each box. Also, comparisons can be made between like but different users. For example, if a first user prefers action-based movies and has previously ordered movies X, Y and Z and if a second user prefers action-based movies, the learning engine may opt to store segments for movies X, Y and Z on the second user's box.

Figure 3B:
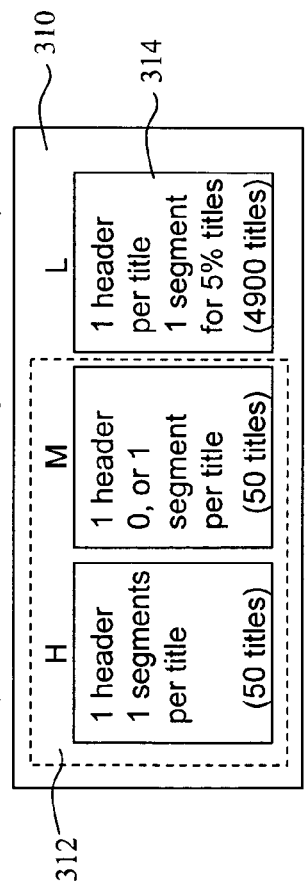
FIG. 3B shows another exemplary popularity classification of titles in a library within a limited storage space in a box.

FIG. 3B shows another exemplary popularity classification of titles in a library within a limited storage space 310 in a box. One of the major differences between FIG. 3A and FIG. 3B is that the top band 302 in FIG. 3A retains one header and two segments for each title therein while the top band 310 in FIG. 3B retains one header and one segment for each title therein.

Contrary to FIG. 3A or FIG. 3B, according to one embodiment, all boxes in service may be configured to include more than two segments for one or more titles in the H band, essentially increasing the number of distributed copies of those highly demanded titles. When a title is newly released or statistically determined popular, the boxes in service can be activated to increase the number of segments for these titles so that dependency of an ordering box on others is significantly reduced.

Figures 3C, 3D:
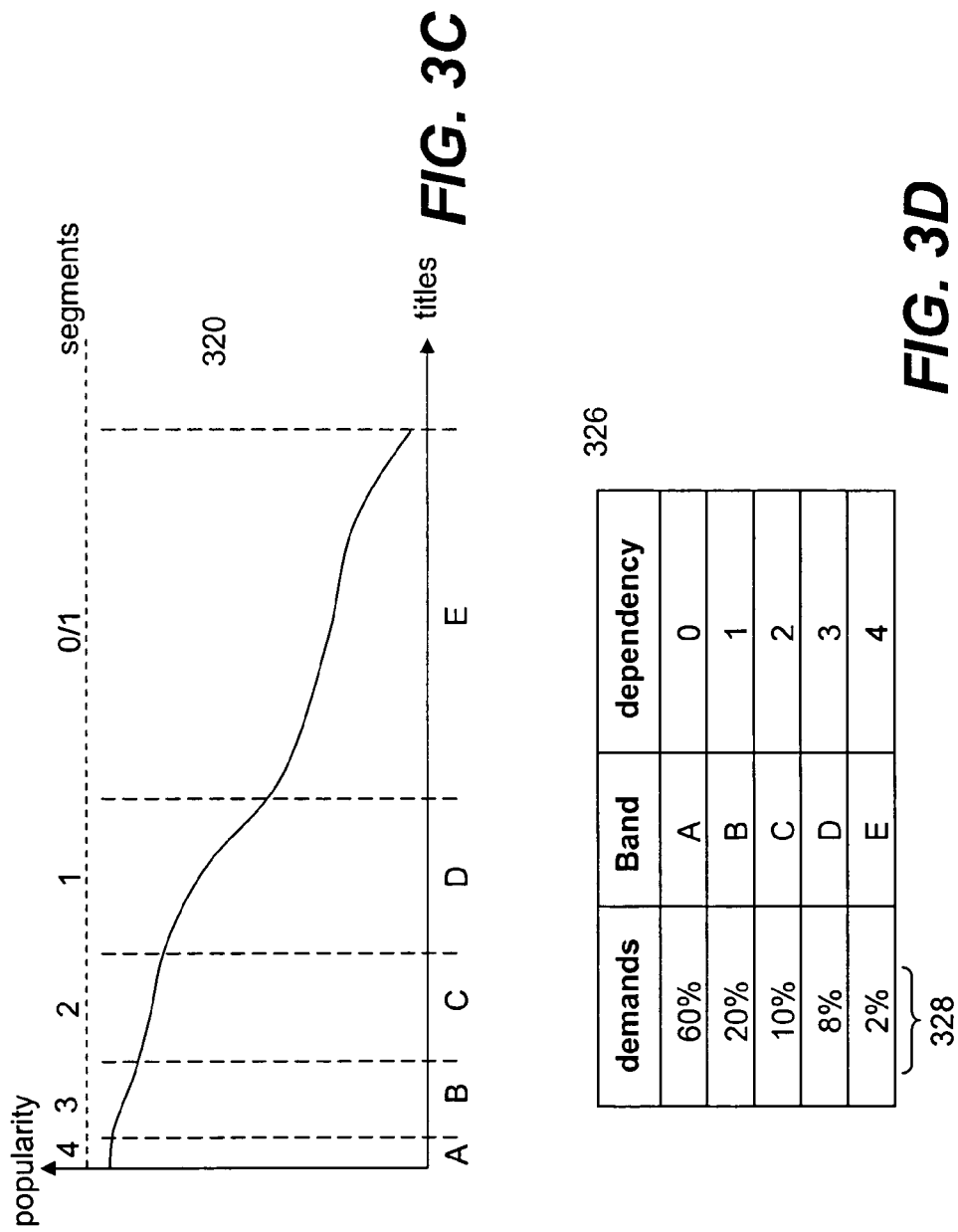
FIG. 3C shows an exemplary banding scheme in accordance with the popularity of the titles in a library.
FIG. 3D shows corresponding dependency of each title in a band for a continuous playback in accordance with a banding shown in FIG. 3C.

FIG. 3C shows another exemplary banding scheme in accordance with the popularity of the titles in a library. The banding scheme divides titles in a library into multiple bands (e.g., 5 bands). The curve 320 shows A, B, C, D and E bands with the A band representing the most popular titles and the E band representing the relatively least popular titles in the library. The titles available in each of the bands may be updated periodically according to one or more measurements from, for example, demand statistics, geographic locations, a preferred language, age of the title, demographic information, or the like. Each box will store the header and all of the corresponding segments for titles in the A band (e.g., one or two newly released titles). Each box will store the header and three segments locally for titles in the B band. Each box will store the header and two segments locally for titles in the C band. Each box will store the header and one segment locally for titles in the D band. And, each box will store the header and one segment locally for a small percentage, say 5%, of titles in the E band. As a result, the dependency of each title in a band for a continuous playback as listed in a table 326 shown in FIG. 3D is 0, 1, 2, 3 and possibly 4, respectively.

For completeness, the table 326 also includes a column 328 showing exemplary statistics of demands for titles in each of the bands, namely, the demands for the titles in the band A are expected to be about 60% of the overall requests for the library. The declining demand for titles in bands B, C, D and E are illustrated as 20%, 10%, 8% and 2%. Although there may be a huge demand for a title in band A, the dependency of the ordering box on other boxes for a title in band A is zero. Therefore, orders for titles in band A can be locally fulfilled. On the other hand, the demand for titles in bands B, C, D and E progressively decreases. Accordingly, the dependency of an ordering box in bands B, C, D and E progressively increases. Distributed copies of titles in the bands B, C, D and E progressively decrease.

The banding scheme described above with reference to FIGS. 3C and 3D may be extended logically to any number of bands for a specified number of segments in accordance with the popularity of the title. For example, we may introduce a band B' that lies between bands B and C in the previous example, with each box storing an average of 2.5 segments per title in the band. One way to create and control such an average number of segments would to let half the boxes store 2 segments and half the nodes store three. In an extreme case, each title would not only have a different number of segments, but each box may also independently determine how many segments to cache locally for each title. In general, the more popular a title is, the more segments there will be locally cached and the more distributed copies there will be available in the network. In any case, when a title in a library has no segment locally cached, there must be at least one copy of all corresponding segments in the network. Otherwise, an order for such a title could not be rendered.

Figure 3E:
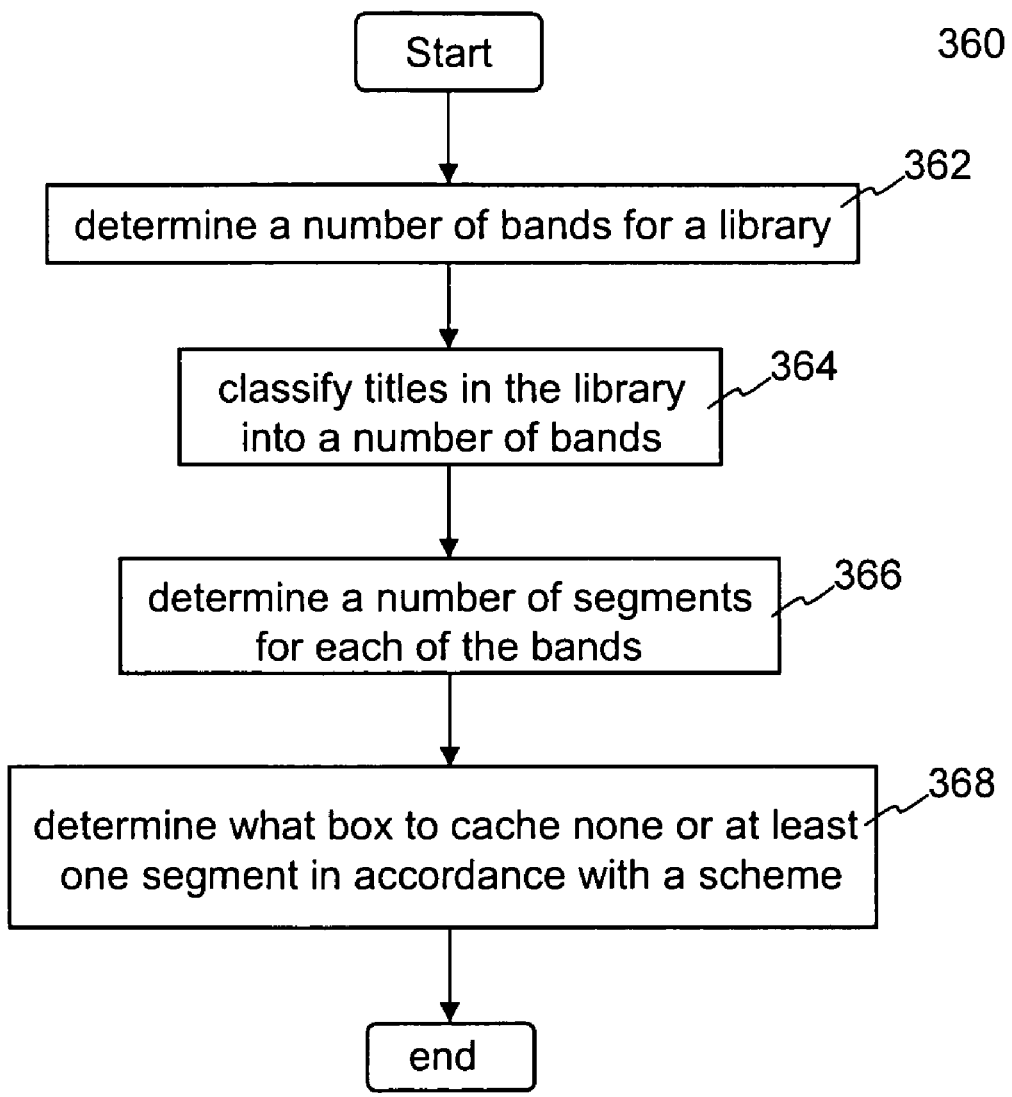
FIG. 3E shows a flowchart or process of classifying a library of many titles for instant access according to one embodiment.

FIG. 3E shows a flowchart or process 360 of classifying a library of titles for instant access. The process 360 may be implemented in software, hardware or a combination of both as a method, a process, and/or a system. When the process 360 is employed in a VOD system, a file pertaining to a title may be fragmented in accordance with the process 260 of FIG. 2E into a header and one or more segments. At 362, it is necessary to determine how files pertaining to the titles should be distributed, thereby defining the number of titles stored in each library. In general, the number of titles available in a library is a function of a number of factors that include the capacity of a storage space in boxes, header size, network speeds, demand, file size, required data transmission speeds, concurrency support, etc. In one embodiment, it is determined that 5000 titles may be offered in a library, each lasting for two hours on average and comprising 840 Mbytes-1 Gbyte in size. The process 260 of FIG. 2E may be used to determine fragmentation of the files. Once the number of the bands is determined, the process 360 goes to 364.

At 364, the titles are classified into bands. At least, two bands are used, a top band for the most popular titles (e.g., new releases) and a low band for relatively less popular titles. Depending on implementation, one or more intermediate bands may be introduced to store titles that neither fit in the top band nor the low band and to facilitate updating a library.

As described above, there will be more distributed copies of titles in the top band than those in other bands to accommodate concurrent orders. In operation, the number of titles in the top band is preferably kept small to optimize the use of the storage space in a box.

At 366, the number of segments for each band is determined. According to one embodiment, more segments for a title in the top band are locally cached, which translates to more distributed copies available in the network. As a result, for a more popular title, an ordering box depends less on other boxes to supply the segments needed for continuous playback of the title. On the other hand, only a percentage of titles in the low band are locally cached, which translates to fewer distributed copies available in the network. If the system is configured to include intermediate bands, the number of segments to be locally cached may decrease progressively from the top band.

At 368, the process 360 determines the boxes in which to cache segments. Depending on implementation, a segment distribution scheme may be based on different factors to optimize segment caching for efficient storage and effective sourcing of titles. In one embodiment, the distribution of segments is determined based on viewing behaviors. By examining the viewing behaviors of users, it may be determined statistically which box is more likely to order a particular title. For example, users who frequently order action movies are more likely to order another action movie. When distributing segments pertaining to titles for action movies, the distribution may be orchestrated to ensure that these segments end up in boxes that are statistically more likely to order action movies. In another embodiment, distribution may be based on preferred languages. The distribution of segments pertaining to titles in a preferred language, e.g., Spanish, may be made so that such segments end up in boxes associated with boxes statistically more likely to order movies in the preferred language.

Figure 3F:
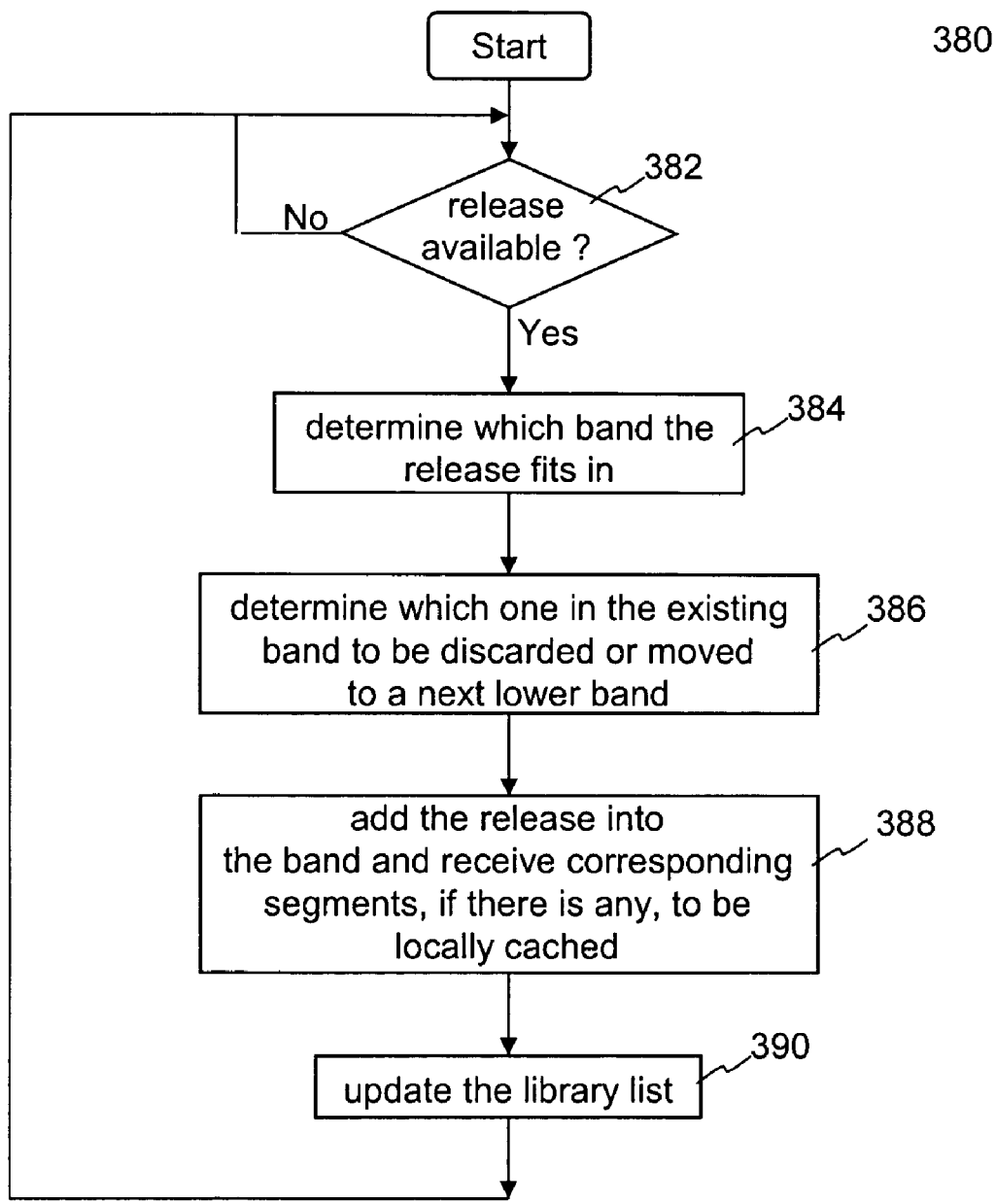
FIG. 3F shows a flowchart or process of updating a library in a box according to one embodiment.

FIG. 3F shows a flowchart or process 380 of updating a library in a box. The process 380 may be implemented in software, hardware or a combination of both, and as a method, a process, and/or a system. When the process 380 is employed in a VOD system, a large file pertaining to a title may be fragmented in accordance with the process 260 of FIG. 2E into a header and several segments. A library in each box is updated periodically or at a predetermined time. The process 380 may be used to dynamically update the library so that all boxes in service are synchronized in terms of the titles available.

At 382, the process 380 awaits a release. As will be further described below, a release (comprising one or more titles) may be provided directly from a server (e.g., the server 202 of FIG. 2A) or propagated from other boxes. Each title in the release is fragmented into a header and a number of segments (e.g., by the process 260 of FIG. 2E). For a title that has been fragmented into a header and four segments, there are six different release packages that boxes may desire (for those titles that require a header and two segments): (header, segment 1, segment 2), (header, segment 1, segment 3), (header, segment 1, segment 4), (header, segment 2, segment 3), (header, segment 2, segment 4), and (header, segment 3, segment 4). At least one of these release packages will be received in a box.

In one embodiment, upon receiving a message that a release is available or data set from either the server or a box, process 380 begins. At 384, in accordance with the release package, an appropriate band for each title in the release is determined. As described above, the title may pertain to any type (e.g., a high band or a low band). Therefore an appropriate band to accommodate the title is determined. To avoid exceeding a predefined number of titles in a band, an existing but relatively least popular title in the band is preferably retired from the band. At 386, such relatively least popular title in the band is determined. In one embodiment, a received message pertaining to the release indicates which existing title in which band is to be discarded or moved to a lower band. At 388, the title is added into the allocated band by receiving in the box the header and the corresponding segments (which may be none) pertaining to the title.

At 390, a library list in the box is updated. Depending on implementation, the library list may be updated locally by removing the retired title and adding the new title, or an updated library list may be received. As a result, the retired title would no longer be available and the new title would be available for order.

Figure 4A:
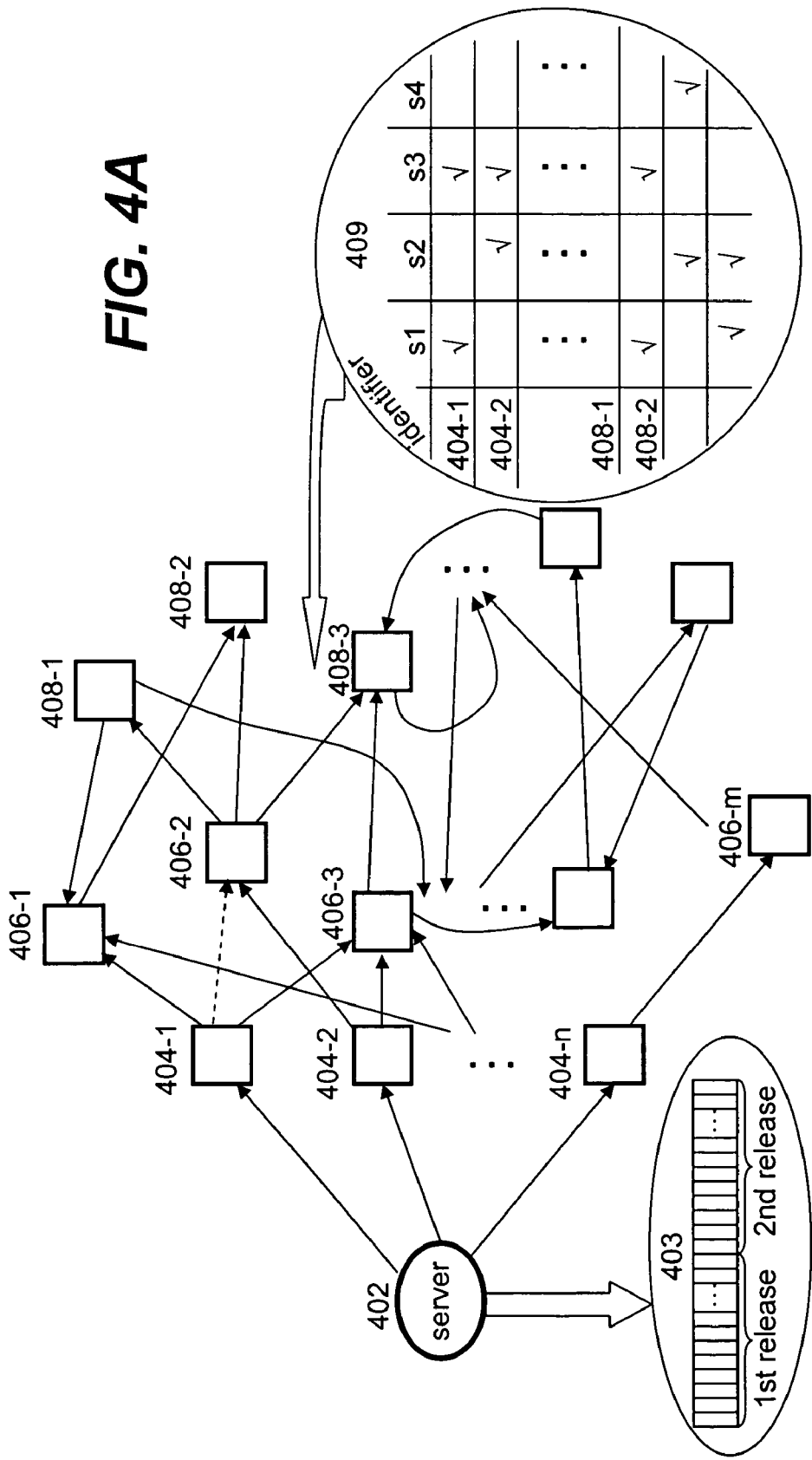
FIG. 4A shows a diagram of updating, synchronously or asynchronously, a library in all boxes in service according to one embodiment.

Referring now to FIG. 4A, there shows a diagram 400 of updating a library of all boxes in service. When a server (e.g., the server 202 of FIG. 2A) updates the library, the library in all the boxes is updated accordingly. According to one embodiment, the updating process is carried synchronously and/or asynchronously.

The server 402 is configured to prepare a file pertaining to the release of a title into a header and segments. One exemplary method to prepare the file is the process 260 of FIG. 2E. For convenience, it is assumed that there are a header and four segments. Accordingly, as described above, depending on which band the release is to be put in, there may be a plurality of release packages. In operation, each of the boxes in service is configured to receive one release package.

Initially, the server prepares a release instruction including metadata about a release, a least popular title to be discarded from the library and/or title transfers. The instruction may describe which box gets which of the release packages and how (the package is to be received (i.e., from which other boxes). For example, the instruction could specify that boxes identified by identifiers that demonstrate certain characteristics are to receive a release package X. There may be a default instruction that applies in general to all releases, and there may be instructions tailored to specific releases as well. One of the objectives of assigning release packages to boxes may be to distribute the packages fairly evenly among all boxes in service to ensure uniform distribution of different segments.

The release instruction, once prepared by the server, is propagated to boxes in service either via direct communication between the server and a box, or by box-to-box propagation of the instruction via a gossip protocol, which will be described in detail below. In any case, it is assumed that each box recognizes the need for it to receive a particular release package.

The release is transformed into a sequence of data chunks 403 representing the header and segments for the release. A data chunk is an atomic unit of data transfer from the server to the boxes, or between two boxes. For example, each of the data chunks may be 1 Mbyte in size and uniquely identified. The sequence of data chunks 403 may represent two separate titles being propagated to the boxes to update the library. In general, each box desires a specific subset of the data chunks that make up a proper release package corresponding to that box. In addition, the release instruction itself may be represented as one or more data chunks that are to be propagated to all boxes.

In operation, the server 402 initiates respective communications with a set of boxes 404-1, 404-2, . . . 404-n and provides each of them with some of the data chunks required by that box. Preferably, each data chunk is seeded into at least one of the boxes by the server 402. The exact number of the boxes 404-1, 404-2, . . . 404-*n* initially to receive the data chunks does not constrain distribution. In one embodiment, the designation of the boxes 404-1, 404-2, . . . 404-*n* is fairly random. In another embodiment, the designation of the boxes 404-1, 404-2, . . . 404-*n* is based on one or more of a time zone, the geographical location, an available network bandwidth, and the latency thereof, the Internet service provider for the box, etc. In any case, whenever the server 402 is idle, the server 402 can always designate different boxes to receive data chunks.

Each of the boxes 404-1, 404-2, . . . 404-*n* is configured to spread data chunks to other boxes in service based on what is commonly referred to as a "gossip protocol," an application-layer multicast-like protocol. It should be noted that not all of the boxes 404-1, 404-2, . . . and 404-*n* have received identical data chunks. Any of the boxes 404-1, 404-2, . . . and 404-*n* may start to spread a data chunk to other boxes as soon as it has received a data chunk in its entirety. In operation, the box 404-1 is assigned to propagate at least some of its received data chunks to boxes 406-1, 406-2 and 406-3, communicating with one or more of these boxes simultaneously. The box 404-2 is assigned to propagate at least some of its received data chunks to boxes 406-2 and 406-3. The box 406-2 is configured to know exactly what data chunks to get from the box 404-1, the box 404-2, and any other boxes configured to feed it chunks of data. Further, the box 406-2 is assigned to propagate at least some of its received data chunks to boxes 408-1, 408-2 and 408-3. Note that the propagation of data is not necessarily hierarchical. For example, box 408-1 might send data chunks "backward" to 406-1, as seen in the figure.

In one embodiment, data chunks are propagated only to boxes that actually desire those particular chunks in order to avoid wasteful data transmission. Moreover, wasteful data transmissions may be avoided by ensuring that a data chunk is propagated to a box only if it does not already possess that chunk and is not in the process of downloading that chunk from elsewhere. The propagation of chunks may be through synchronous protocols where all boxes participate at the same time in a coordinated fashion, or asynchronous protocols in which each box may choose when to participate and for how long in a flexible manner. For example, a box could cease participating in the downloading and propagation of chunks whenever it is busy serving a movie for an ordering box, or when the network is detected to be in a period of intense usage. The box may continuously monitor the network conditions, and adaptively rejoin the gossiping propagation when there is sufficient bandwidth available.

In operation, if any one of the boxes, for whatever reason, fails to accept data chunks, the box could be dropped as a supplier or a substitute box could be configured to receive and supply the data chunk. The box that missed the release may fetch the data later from one or more updated boxes. By repeatedly and recursively propagating data chunks via boxes after boxes (i.e., by pulling or pushing synchronously and/or asynchronously), eventually all boxes in service will be populated with each release (the header and designated segments of all titles to be added and the identification of titles to be removed).

After updating is finished, a map 409 identifying which box has which segments can be developed. By the map 409, whenever an order is received from an ordering box, the server can designate appropriate boxes to supply the non-locally cached segments to the ordering box. Alternatively, the map 409 enables a box to obtain source information to fetch needed segments to fulfill an order.

When the release is not for the top band, the determination of which box to retain what segment(s) may be based on several factors such as geographic locations, time zone, viewing behaviors or a preferred language so as to maximize the efficiency of transporting the segments among the boxes when needed.

It should be appreciated that deletion of titles from a list of available titles may be distributed to the boxes first. That way, no box will order a title that is no longer available. Distributing title deletion instructions may be implemented using the gossip protocol discussed above or may be provided by direct box-to-server communication.

Figure 4B:
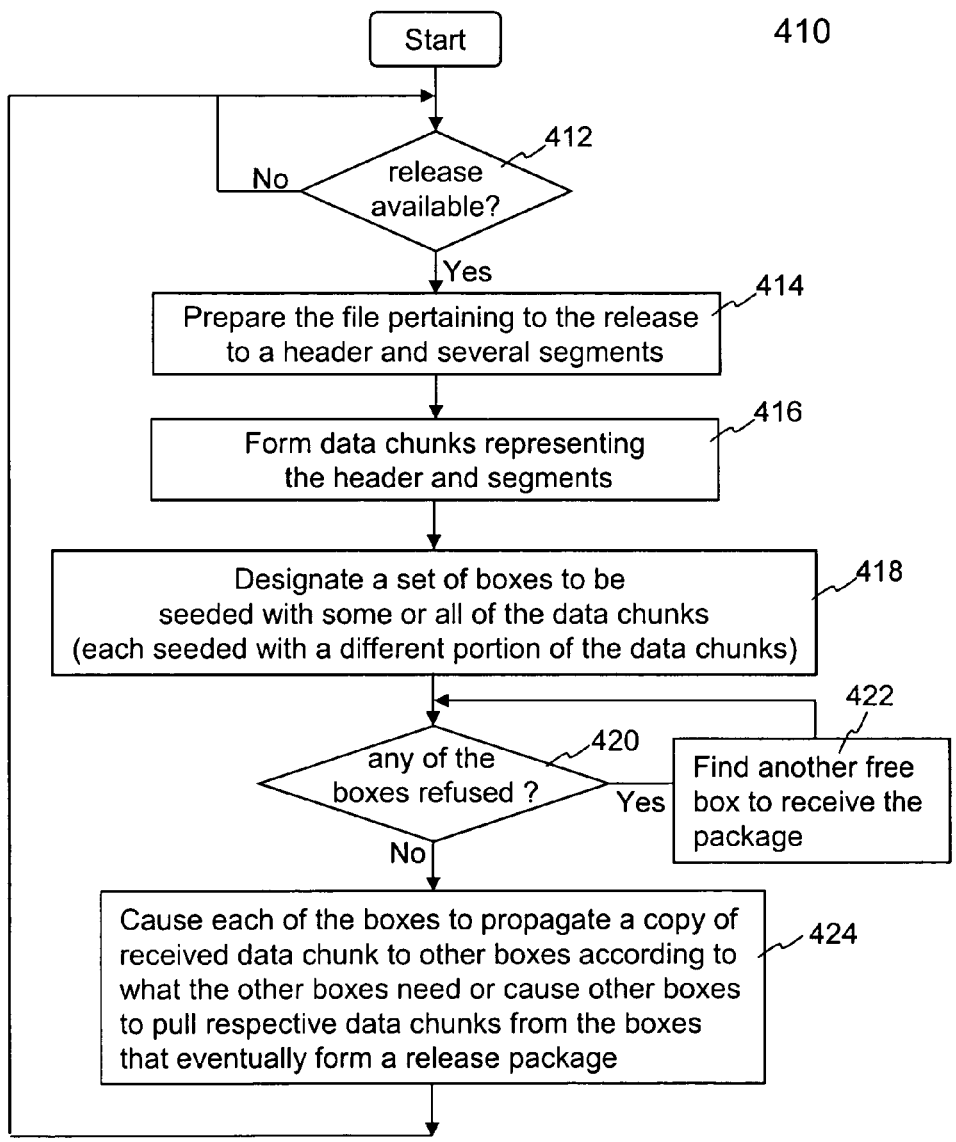
FIG. 4B shows a flowchart or process of seeding a release in boxes in service according to one embodiment.

Referring now to FIG. 4B, there shows a flowchart or process 410 of seeding a release to boxes in service. The process 410 may be implemented in software, hardware or a combination of both. The process 410 is particularly useful to update a directory that is maintained in multiple locations without using a centralized server. One of the possible features, advantages and benefits of the process 410 is that the directory in the multiple locations is updated synchronously and/or asynchronously by propagating an update in data chunks via locations to locations by an application-layer multicast-like gossip protocol. When the process 410 is employed in a VOD system, a library with many titles may be updated dynamically or efficiently without requiring high bandwidth to support simultaneous updating.

At 412, the process awaits a release that may become available at a device (e.g., a server by a service provider) on the data network. When the release becomes available, the files pertaining to the release are prepared in a server at 414 for distribution to the boxes. The process 260 of FIG. 2E may be an exemplary process for fragmentation into a header and corresponding segments for each of the files.

At 416, the header and segments are divided into chunks of data. At 418, the server designates an initial set of boxes to receive at least some of the data chunks. In one embodiment, the boxes may not receive identical data chunks. Depending on implementation, the server may push respective sets of data chunks to the initial boxes or the initial boxes may pull respective set of data chunks from the server. In some embodiments, a copy of all data chunks is distributed to the initial boxes so that the initial boxes may seed the other boxes in the system without further involving the server.

At 420, the process 410 determines whether any one of the boxes were unable to receive any of the data chunks. If there is a box that does not receive the data chunks, the process goes to 422 where a box that does not belong to the initial set replaces the failing one. As a result, at least one complete set of data chunks may be initially distributed synchronously or asynchronously among the set of seeding boxes.

The process 410 then moves to 424, where each of the seeding boxes is configured to spread at least some of the received data chunks to one or more other boxes (e.g., another set of boxes physically nearby), each of which is configured to further spread at least some of its received data chunks to other boxes. It should be noted that any box may at the same time communicate with more than one box to collectively fetch data chunks. The process 410 then returns to 412 awaiting any other release.

In operation, the process 410 is not limited to updating a library one title at a time. By transforming titles into data chunks, more than one title may be spread into the system by propagating the data chunks from boxes to boxes asynchronously. Also the process 410 does not have to end before another title can be distributed. Before one release has been completely seeded in the boxes in service, another release may be made available for distribution. In operation, the process 410 is preferably started when network traffic is low, such as at midnight. Typically, the process 410 may take hours to finish.

Figure 4D:
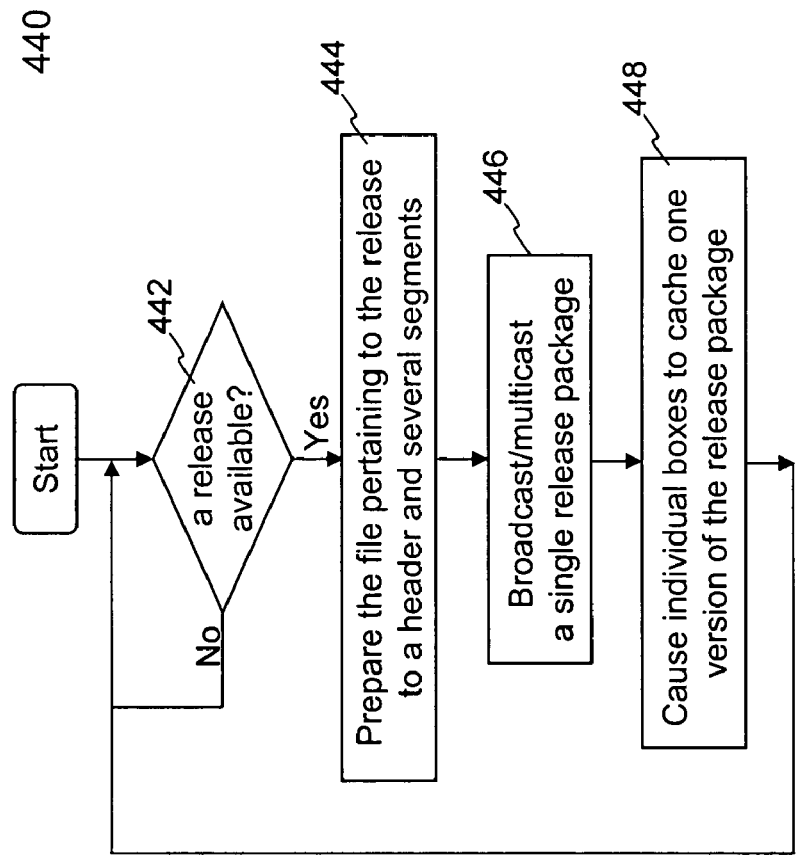
FIG. 4D shows a exemplary flowchart or process of seeding a release in boxes in service for a configuration in which the bandwidth for broadcasting or multicasting is sufficient.

FIG. 4D shows a flowchart or process 440 of seeding a release to boxes in service for a configuration in which a service provider is provided with one or more high-bandwidth channels for broadcasting or multicasting. Such configuration may be found in a cable or satellite infrastructure that enjoys very high speed broadcasting or multicasting capability, or in a data network with multicast support. The process 410, preferably understood in conjunction with FIG. 4C, takes advantages of such infrastructure to update a library in boxes with one or more titles, wherein the boxes are assumed to be equipped with the receiving capability (e.g., tuners) and tuned to appropriate channel(s) for receiving the broadcast(s). Examples of such boxes include a satellite receiving box and a cable set-top box.

Figure 4C:
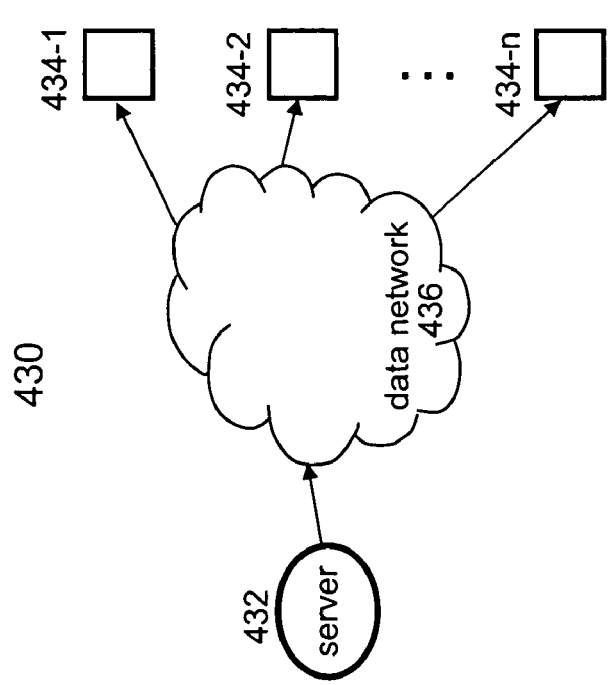
FIG. 4C shows an exemplary situation in which a service provider is provided with an infrastructure of high bandwidth broadcasting capability.

As shown in FIG. 4C, a server 432 is coupled to a network 436 that may be a cable network (i.e., the coaxial cables or fibers as the medium) or a satellite network (i.e., the air as the transmission medium). Similar to the server 402 of FIG. 4A, the server 432 is responsible for distributing a release. At 442, the process 440 awaits a release. The process 440 is activated when a release become available. The titles pertaining to the release is prepared at 444 in the server 432 for distribution to the boxes. The process 260 of FIG. 2E is an exemplary process for fragmentation into a header and corresponding segments for each title.

At 446, a release package including the header and all segments for all titles is broadcast to the network 436 at a predefined time or periodically. In accordance with an instruction that may be received from the server 432 or that may be locally configured, each box captures and caches the data in accordance with its configuration from the release at 448. For example, a box supposed to receive a header and no segments only captures and caches the header. If a box is supposed to receive a header and two segments, the box only captures and caches the header and the two segments.

Since each of the boxes in service chooses appropriate data from the consolidated single release package, the library in each box is updated synchronously. In the event that some boxes are unable to update at the time of broadcast, these boxes can be updated in a next broadcast or asynchronously with other updated boxes using the process 410 of FIG. 4B as described above. In one embodiment, multiple channels in the cable or satellite infrastructure may be utilized to expedite the updating process by broadcasting or multicasting, for example, a respective release package in a specified channel. As described above, in one scenario, there may be six different release packages, each for one type of box. As such, a box may be configured to tune to the specific channel for its release.

New boxes recently placed in service or recently reconnected to a network after a lengthy period of time are collectively referred to herein as new boxes. These new boxes may be empty or include headers and segments of titles available at the time of being packaged for shipment or being unplugged from the network, but now pertaining to some titles currently available and some titles currently unavailable. During the time these new boxes were disconnected from the network, the library in active boxes will have been updated many times. As a result, the original library will be outdated.

Figure 5A:
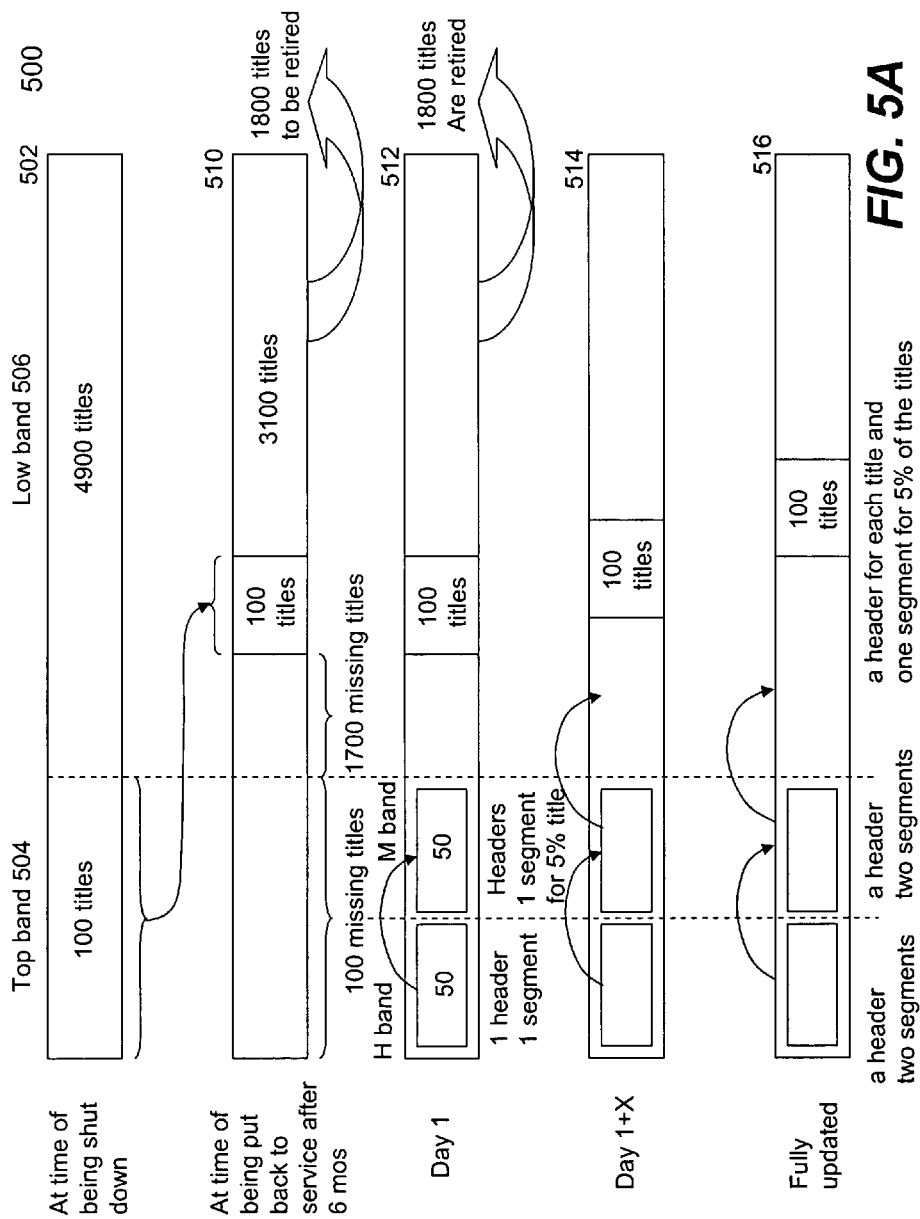
FIG. 5A shows progressive changes to a library in a new box, according to one embodiment.

It is assumed that a service provider updates a library with ten releases each day and the total number of titles in the library is 5000. If the idle time is ten days, the original library has missed one hundred releases. If the idle time is about six months, the original library in the boxes would be outdated by about 1800 releases. FIG. 5A shows progressive updates to a library 500 according to one embodiment. At the time of becoming a new box (being unplugged or just copied with the library before shipment), the box includes 100 titles in the top band 504 and 4900 titles in the low band 506. For a box that has been out of service for 180 days, the library status 510 shows how outdated the box is, namely, that the library 500 has missed 1800 releases, 100 of which are the releases that in the top band 504 and 1700 of which are releases in the low band 506. It will be appreciated that, if there is a run on stores to purchase these boxes, there will not be many titles to update. Similarly, if there is not a run on stores to purchase these boxes, then there will not be many boxes to update, even though the titles in the new boxes may be quite outdated.

It is commonly understood that releases decline in demand or popularity over time and eventually are put into a low band 506. Therefore, after 180 days, there are about 1800 titles in the original library 500 that should be retired, and only 3200 titles in the original library 500 that may remain in the library 510. In one embodiment, the 1800 titles will be retired immediately at the time the box is put into service since the network no longer supports them.

To update the library 510, the box must receive the 1800 missing headers and segments corresponding to the box type and band information. To download each of the headers and corresponding segments for the 1800 releases, subject to the bandwidth of a network, it could take days, weeks or even months before the box could be used for ordering a title, which is not operationally desired.

In one embodiment, the process of speeding up the update of a box is achieved by dividing the top band into additional bands. For example, there may be two bands, referred to as high (H) and Medium (M) band, respectively. Each band may be assigned a number of titles, for example 50 titles in the H band and 50 titles in the M band. For convenience, FIG. 3A may be used as an exemplary popularity classification of titles with the H band, the M band and the L band. To reduce the time a box needs to update the library, the fetching of a large number of segments for the M band may be avoided. The rationale behind this idea is that titles in the M band are declining in popularity anyway, and will soon not need that many distributed segments in the network to support concurrent demand. Thus, for example, a new box may choose to treat the M band titles like the L band, and store one segment for only a small percentage of these titles.

In the same or another embodiment, a box enables the user to quickly gain access to the popular titles in the library, and soon gain access to the entire library, by fetching the headers of the missing titles before fetching the segments. It is to be noted that the user can order and play back a title so long as the header is present locally in a box; no segments need to be cached locally to enable playback, even if the title happens to be in the H band, since it will be possible to fetch the distributed segments from across the network. Therefore, a good strategy for updating a box is to give precedence to fetching headers ahead of tails, and moreover, order the sequence in which headers are fetched according to title popularity, so that the most popular titles are made immediately available.

In the same or another embodiment, some tail segments may be given higher precedence over some headers, so that some segments are quickly received by a box and it can start acting as a useful supplier of segments and serve demand from other boxes. It may be appreciated that there are many different ways to determine which segments are given precedence over which headers, depending on the trade-off that needs to be struck between how quickly the user needs to be given access to the entire library, and how critical it is that the user's box becomes a useful supplier that bears some of the system's load. We describe one particular embodiment of precedence choices involving headers and segments below.

According to one embodiment, a new box begins by downloading a header and one corresponding segment for each of the 50 titles in the H band; this data may be fetched from other boxes that have the corresponding headers and respective segments for the 50 titles. The library status 512 shows the desired status of the H band being updated on Day 1 (assuming that the entire update of the H band finishes in a day). It may be appreciated that there may be several ways to update the titles in the H band. In one embodiment, the headers for the H band starting from the most demanded title are progressively fetched first, followed by the segments for each title in the H band. In another embodiment, a header and corresponding segment for each title in the H band, starting from the most demanded title, are progressively fetched first.

After the 50 titles in the H band are nearly updated (in the case where each H band title requires two local segments, each title still has one missing segment at this stage), the 50 titles in the M band are to be updated next. However, during the updating of the 50 titles in the H band, other titles are being added into the library by dynamic updating. As a result, there may be less than 50 titles in the M band to be updated because one or more titles may have been retired from the H band into the M band (shown by arrows in the figure). In one embodiment, a header for each of the titles in the M band is fetched from other boxes in service and one segment for only 5% of the titles in the M band is fetched. In another embodiment, only the headers for the M band title may be fetched, leaving the segments to be fetched later on. The intermediate status of the M band can be better appreciated in FIG. 3A to explain why there are zero, one and two segments for the titles in the M band.

After day 1+X (see library status 514), where X indicates the time required to update the H and M bands, depending on the network speeds, a certain number of the titles from the H band may be retired into the M band, and at the same time, a corresponding number of the titles in the M band may be retired into the L band. If the library is organized progressively in terms of ages of the titles in the library, it may be appreciated that the original 100 titles in the library status 502 have been shifted and that, although there are 1700 titles in the L band that should have been updated, the retirements from the top band 504 has in fact reduced the actual number of the titles to be updated. At this time, the headers for titles in the L band are fetched continuously, until headers are received for all missing titles. Finally, all missing segments are fetched as well, for titles in the H, M and L bands. Library status 516 depicts the final state of the library after the updating process is completed.

Figure 5B:
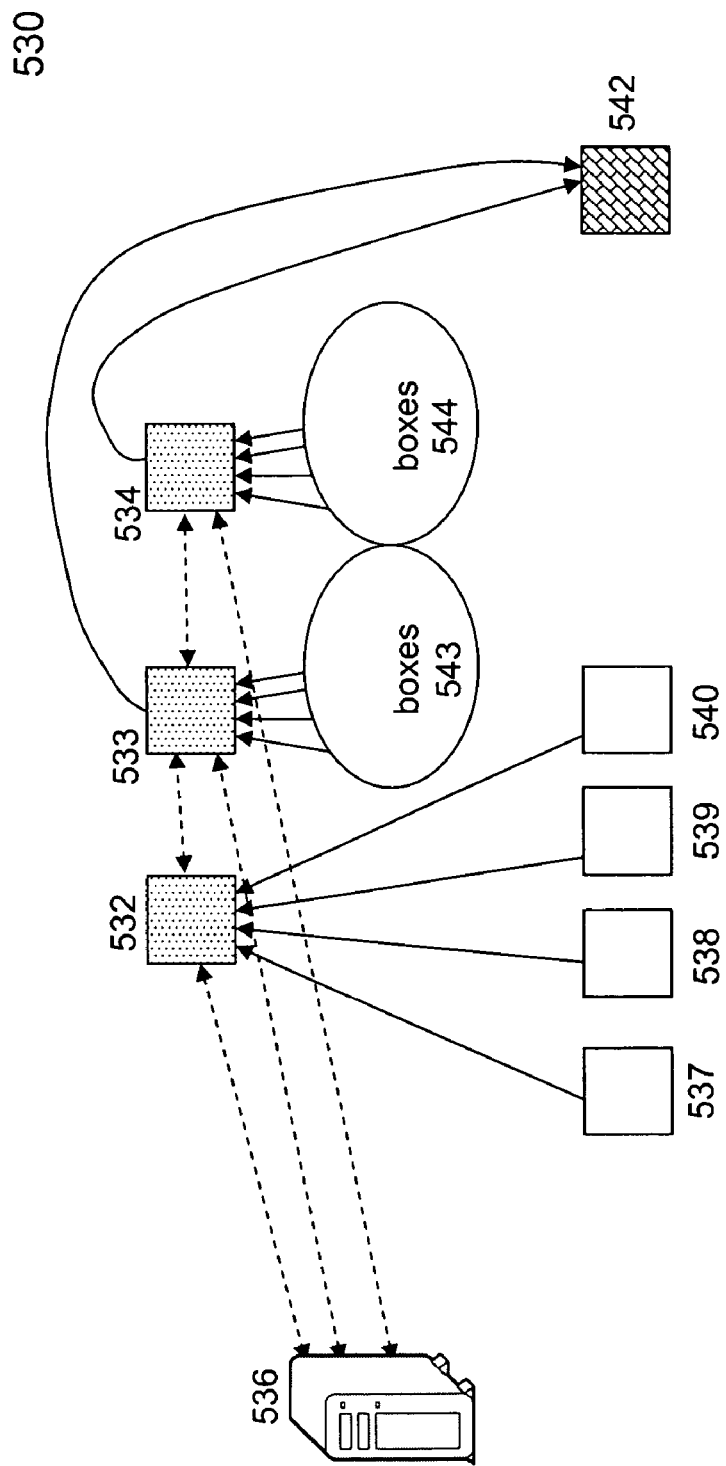
FIG. 5B shows an exemplary situation in which three new boxes are added into the system.

FIG. 5B shows a situation 530 in which three boxes 532-534 have just been added into the system. After the three boxes 532-534 have registered respectively with a server 536 with their respective identifiers and/or IP addresses and library statuses, the server 536 returns with information on what these boxes have missed in the past and how to get updated, for example, where to fetch the missing titles. The situation 530 shows that the box 532 shall initially fetch the missing titles (e.g., a header, or perhaps a corresponding segment) from a group of boxes 537-540, and the boxes 533 and 534 shall initially fetch the missing headers from a group of boxes 543 and 544, respectively. It is noted that in operation a box (i.e., 532) is configured to dynamically switch from boxes to boxes to fetch corresponding headers and/or segments.

It is assumed that the three boxes 532-534 are initially updated with one header and one segment for each of the titles in the top band (i.e., the H band). In operation, the three boxes 532-534 can be candidates to start serving others (e.g., for titles in the H band). In FIG. 5B, an ordering box 542 is placing an order for a title in the top band. It is also assumed that the title pertains to a file that has a header and four segments, two of which reside in the ordering box 542. Therefore the ordering box 542 needs to fetch the other two missing segments. While the header for the title is being played, the ordering box 542 may get the missing segments from any two of the boxes 532-534, provided that each of them has one of the two missing segments and not all of them have an identical one of the two missing segments. As the box groups 537-540, 543 and 544 are busy to update the boxes 532-534, the boxes 532-534 start to serve others as soon as segments for the releases in the H band become available. Hence, it may be appreciated that the maximum sustainable concurrency for titles in the H band remains unchanged. Moreover, it will be appreciated that playback support for newly released titles may be diverted to the new boxes, since the new boxes can only support playback of the new releases. This could reduce traffic problems significantly and improve the maximum concurrency sustainable for a title in any band.

Figure 5C:
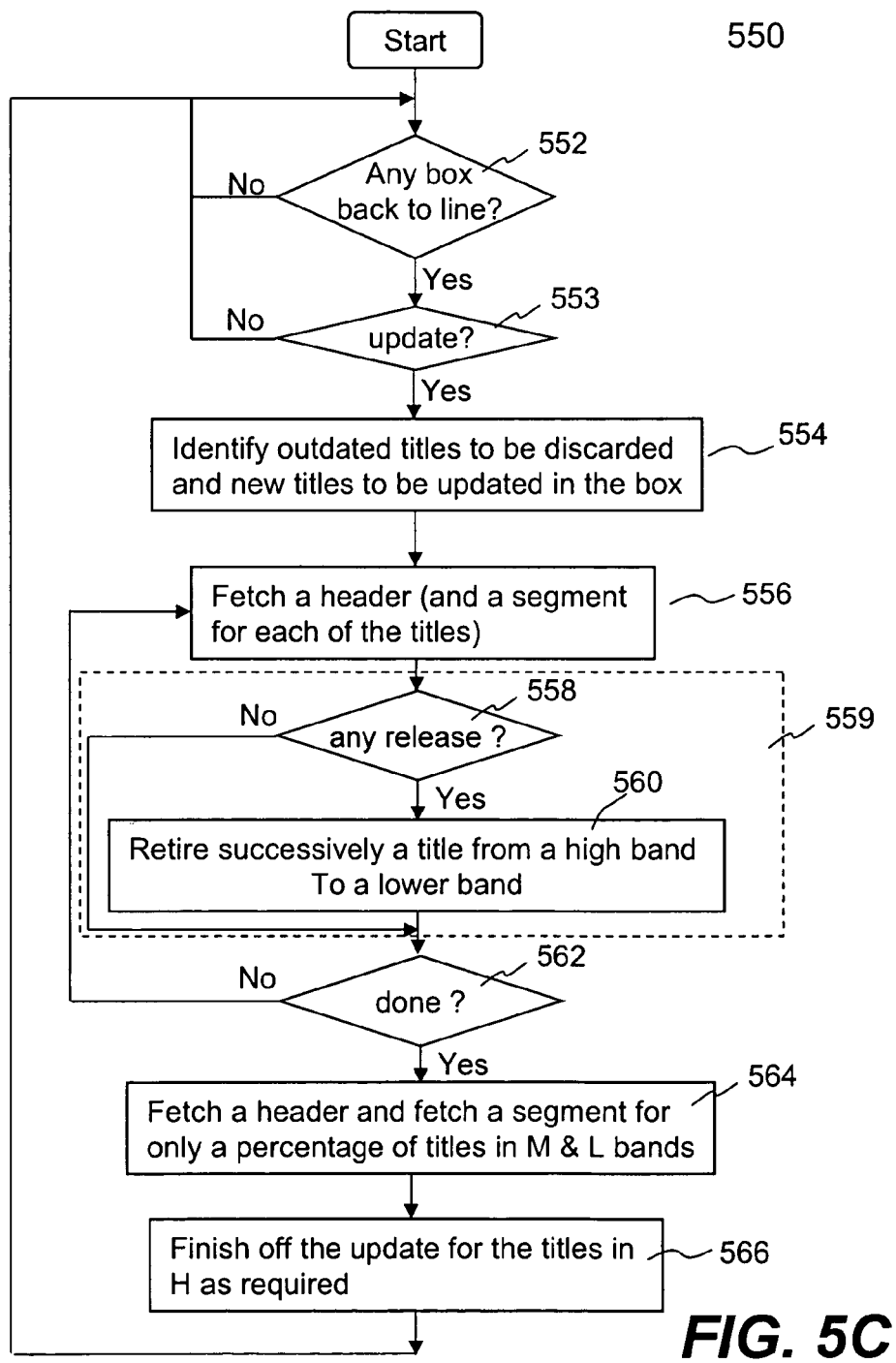
FIG. 5C shows a flowchart or process of updating a library in a box that has not been online for a period of time, and consequently has an obsolete library therein.

Referring now to FIG. 5C, there shows a flowchart or process 550 of updating a library in a box that has not been online for a period of time, perhaps due to its being on store shelves for a long period after it has been manufactured. The process 550 may be implemented in software, hardware or a combination of both as a method, a process, and/or a system. The process 550 awaits any new boxes that are coupled to a network at 552. The process 550 is activated when a new box is detected in the network or a server is notified of the presence of a new box. In one embodiment, the new box, once powered and connected to the network, is configured to automatically inform and/or register with a server associated with a service provider. The box may send a notification including its identifier and an IP address thereof, and perhaps the date/time the box was last updated.

At 553, the process 550 detects whether the library in the box needs to be updated in accordance with a record. There are cases that the library in a box does not need to be updated; for example, if the box was powered off for a short period of time, it may not have missed any new content. In one embodiment, the server determines whether the library needs to be updated in accordance with the status of the box. If there is no need to update the library, the process 550 goes back to 552 waiting for another new box. If it is determined that the library needs to be updated, the process goes to 554.

At 554, the set of outdated titles in the library, and the set of releases missed in the past, or currently missing from the box, either due to the box being off-line or due to storage errors, needs to be determined. To synchronize with the updated library in other boxes, the outdated titles are flagged as not being accessible any more (even if the data may still be available in the box). The process 550 then proceeds with the updating of the library at 556. As described above, the library is initially updated with the headers of the high band titles so that the box may accept orders of these titles and support the orders of other boxes for these titles. In operation, as soon as a header is cached locally, the box is in condition to fulfill an order for a title associated with the header. For the high band titles, the box is configured at 556 to fetch a header, or a header and a corresponding segment for each of these titles from other boxes. One of the exemplary mechanisms to fetch the headers or the segments is by the application-layer multicast-like gossip protocol as described above.

The system may be designed to require that each box store a header and only one segment of the high band titles. Alternatively, the system may be designed to require that each box store a header and more than one segment of the high band titles. In any case, the box is ready to serve other boxes for fulfilling an order or updating a library. Further, it will be appreciated that the responsibility for updating a new box with the new titles may be diverted to newer boxes since they will only be able to assist with updating new titles.

While the titles in the top band are being updated, the process 550 checks whether there is any release from the server. If there is a release at 558, depending on where the release fits in the library, an appropriate title in the library may be affected. In one embodiment, the library is virtually divided into a number of high, intermediate and low bands. If a title in the release is supposed to be in the high band, a relatively less popular title in the high band is retired to a next lower band, which essentially reduces the actual number of the titles originally determined at 554. If there is no release or the release only includes not the most demanded titles, the process 550 continues between 556 and 562 until the titles in the high band are updated. In operation, the titles in each band are successively and progressively retired from one band to a lower band in terms of popularity and/or age. For convenience, it is assumed that three bands, H, M and L bands are used.

Now the process 550 goes to 564 to fetch a header for all the titles in the M and L bands and additionally a corresponding segment for a small percentage of the titles in the M band and L band. In one embodiment, 5% of the titles in the M band for now have a segment and 5% of the titles in the L band also have a segment. As a result, updating the library avoids stopping the box from providing services. In any case, every time a title is retired from the H band to the M band, the corresponding segment thereof is simply moved to the M band. Any other segment may be discarded per the system design. And, when a title is moved to the L band, the segment for the title may be retained in the L band or discarded depending on whether this title falls into the percentage of the titles that are designated for this box. In the case of controlling a fixed number of titles and preserving the local storage, a corresponding title in the L band, typically the most unpopular, is discarded or overwritten. It may be appreciated that the discarding of segments can be done lazily when the box begins to run out of storage space, and can be avoided if there is more storage space available.

At 566, the process 550 continues to fetch segments for titles in the H band and/or M band without affecting the box from servicing the users or other boxes. It is described that there is a case in which there are two segments for a title in the H band. It is recalled that at 556, only one of the segments has been fetched so as to minimize the time to have the box ready for servicing users or other boxes. Accordingly, another segment may be fetched now at 566. Likewise, every title in the M band is supposed to have at least one segment but only 5% of the titles therein have a segment thus far. Accordingly, the respective corresponding segments may be fetched from other boxes without preventing the box from servicing the user or other boxes.

Not directly shown in FIG. 5C, operations similar to 559 are inherently included in 564 and 566, respectively. Further, some of the process 550 can be carried out any time in a day, preferably when the traffic in the network is low. When choosing other boxes to supply the needed data to update the library, these boxes may be decided or switched from time to time to take advantage of the conditions in the network, geographic locality, sustained bandwidth realized between the supplier and the receiver, etc. as well as the conditions of the boxes themselves.

It may also be understood that the availability of a high-bandwidth broadcast or multicast channel, such as those available via Cable or Satellite networks or through IP multicast, can be exploited to speed up the process of updating a box, just as described earlier in the context of seeding new movies. Broadcast channels may be devoted to transmission of the latest releases, perhaps giving precedence to those titles in highest demand. New boxes may then tune to the appropriate channel(s) to quickly receive headers and segments for the titles they are missing.

Figure 6A:
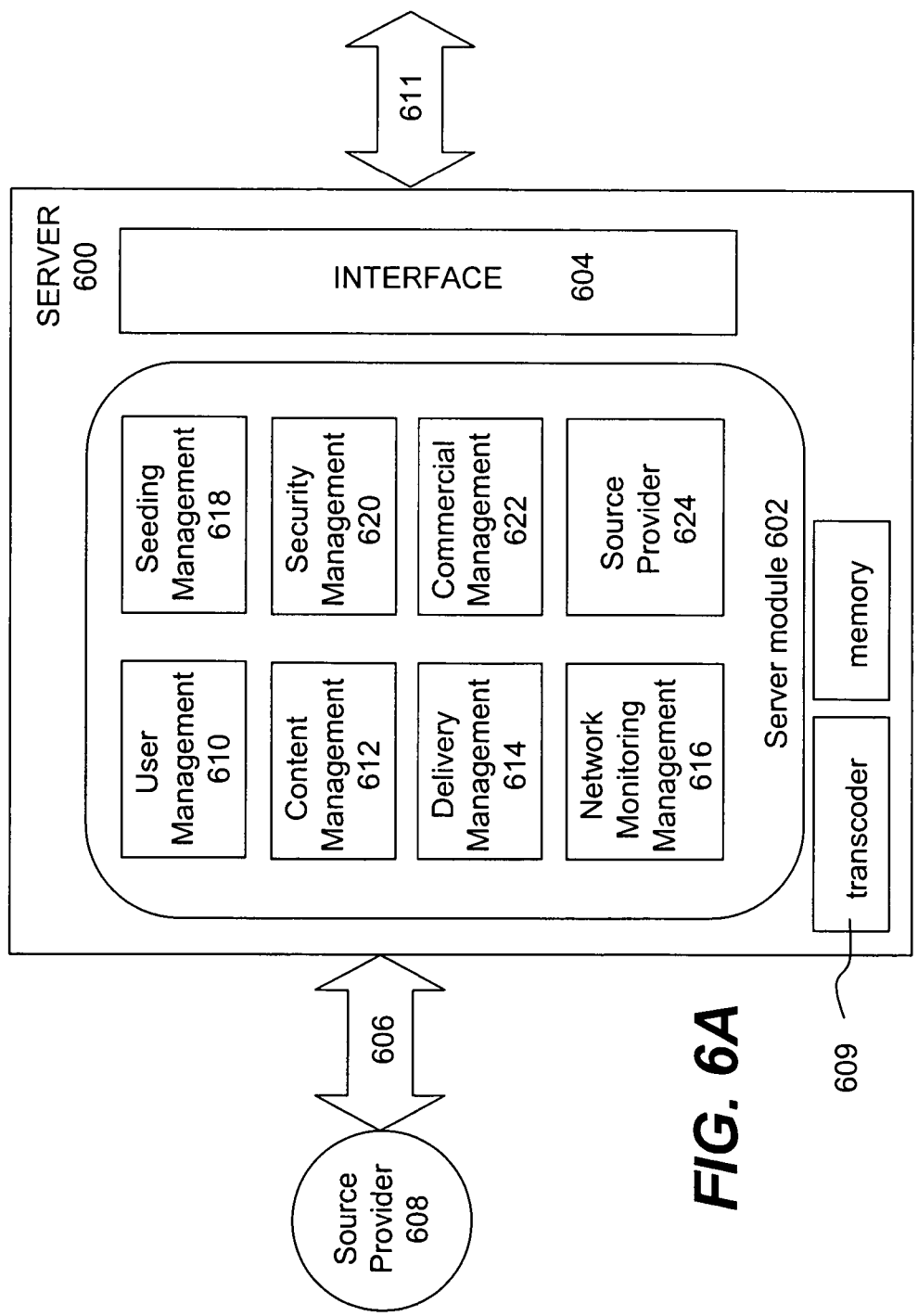
FIG. 6A shows one exemplary implementation of a server according to the present invention.

Referring now to FIG. 6A, there shows one exemplary implementation of a server 600. The server 600 may correspond with the server 102 of FIG. 1A, and may be a single computing device or a cluster of computers. The sever 600 includes a server module 602 and an interface 604. In general, the server module 602 is loaded in a memory and executed by one or more processors (not shown) to perform its operations. In application, the server 600 may be operated by a service provider or an enterprise to provide media services to users.

The server 600 also includes a delivery agent 606 that facilitates communications between a content or source provider 608 and the server 600. Depending on implementation, the source provider 608 may include, but may not be limited to, a content receiver, a content producer, and a movie publisher. The delivery agent 606 is provided to ensure contents are received properly from the source provider 608. Depending on how the content is received, the delivery agent 606 may be implemented in various forms. For example, a movie publisher releases movies to a service provider operating the server 600. The movies may be transported securely to the server 600, in which case the delivery agent 606 is a secure transmission medium. In another example, the content may be transported by satellite, in which case, the delivery agent 606 may be a satellite receiver. In still another example in which a corporation desires to advertise its products or services via the server 600 to a plurality of users, the corporation may deliver a commercial video to the server 600 via the internet. Accordingly, the delivery agent 606 is part of the Internet or a local network and provides a necessary interface (e.g., TCP/IP) to facilitate data communication between the server 600 and the Internet. Other examples are also possible.

For efficiency, the server 600 may include or be coupled to a transcoder 609 that is provided to convert source files in various formats into an acceptable format which is understood by client boxes. Typically, a video source provided by a content provider could be high-definition video signals, DVDs, film, etc. If that format is not a desired format for the server 600, the transcoder 609 is activated to convert such source to the acceptable format (e.g., MPEG-2 or MPEG-4). As described above, the source provider 608 may provide many types of sources. With the transcoder 609 or an appropriate device with similar functions, the server 600 can receive any type of sources and distribute them to users for fees or for information.

The server 600 includes another interface 604 that facilitates data communication between the server 600 and a plurality of boxes in service over a data network 611, wherein the server 600 may be located remotely with respect to the boxes. The network 611 can be part of a large network including the Internet, the public switch telephone network (PSTN), a private network, or a wireless network. The network 611 may use one or more different transmission media, such as telephone lines, cables, fibers or air (wireless). An exemplary communication protocol used for communications between the server 600 and the boxes is TCP/IP.

As shown in FIG. 6A, the server module 602 includes a plurality of functional engines or modules that are configured to work cooperatively with each other. Not every module listed in the server module 602 of FIG. 6A must be employed in practice. Depending on actual implementation or needs, the modules may be selectively deployed.

User management module 610 is configured to manage subscribers or users. It facilitates addition, deletion or updating of accounts pertaining to all users subscribing to or desiring to receive media services from the service provider. The user management module 610 also manages payment settlement for all the accounts. In one embodiment, each account is billed for a fixed monthly fee that allows unlimited access to the media service. In another embodiment, each account is updated or charged whenever an order for a title in a library provided by the service provider is placed.

Content management module 612 manages all content that may be provided to the users. As described above, the content is organized in the form of headers and segments. These objects are distributed among the boxes in service. The content management module 612 is configured to manage the distribution of these objects. By accessing the content management module 612, an operator may control directly how to distribute objects related to titles in the library and get mapping information on what is available and how and where these objects are distributed. FIG. 6B shows an exemplary map 630 illustrating how a library of 5000 titles is distributed across N boxes. Column 632 lists all boxes in service. Each box is assigned a unique identifier for identification. Information in the column 632 may be viewed as the identifiers for the boxes in service. For example, box 1 is assigned a unique identifier of "Box 1" or a sequence of alphanumeric characters.

Column 634 lists a corresponding IP address for each of the boxes listed in column 632. Column 636 lists the headers for all titles in the library. Column 638 lists what segments for title 1 are residing in each of the boxes, assuming title1 is required to have two segments cached in each box. Column 640 lists what segment for title2 is residing in each of the boxes, assuming title2 is required to have one segment cached in each of the boxes. Column 642 lists what segment for title5000 is in a selected set of boxes, assuming title5000 is required to have one segment in these selected boxes. As a result, all objects (i.e., headers or segments) in a box may be uniquely addressed for uploading to another box or playback of an ordered title locally.

Delivery management module 614 is configured to respond to an order received from an ordering box. Working with the content management module 612, the delivery management module 614 creates, in responding to the order, a response that includes source information, authentication information and security information. An example of the source information is graphically illustrated as a table 650 in FIG. 6C or a table 652 in FIG. 6D. The table 650 includes an IP address (e.g., IPA1) for each of the four boxes that are designated to supply the segments for an ordered title. The authentication information authenticates the ordering box for secured communications with other boxes. The security information facilitates decryption of any data for playback of the title. The response may further include an IP address identifying the ordering box and instructions as to what segments to retrieve from other boxes. Upon receiving the response, the ordering box allows the header corresponding to a title (assumed in the L band) being selected to be played, and at the same time or substantially soon after, the ordering box initiates four respective requests in accordance with the response received from the server. It is understood that each of the requests includes an IP address of one of the four boxes. When each of the four boxes receives one of the requests, the requested segment is released or uploaded to the ordering box.

Network management module 616 is provided to monitor the status of each of the boxes in service. In one application, the network management module 616 is configured to receive an address of a box. In many cases, a box is assigned a dynamic address by an Internet service provider that may be changed from time to time. To ensure each and every box in service is in contact with the server 600, whenever the IP address of a box is changed for whatever reason, the new IP address thereof must be notified to the server in time. In one embodiment, each of the boxes is configured to send or receive a short message event triggered or periodically to or from the server such that the network management module 616 updates, if necessary, the IP address for the box that has changed its IP address. On the other end, the network management module 616 is configured to send a short message to each of the boxes for a short response. If a box is out of operation (e.g., powered off or malfunctioning), the network management module 616 is thus notified immediately and updates the delivery management module 614 that may exclude the box out of designation for providing segments for an ordering box. Similarly, if a box is already supplying a segment for a movie order, the network management module may keep the delivery management module informed of the box's availability status for supplying a segment for another order.

Seeding management module 618 may also be referred to as a library management module. The seeding management module 618 is responsible for updating the library in each box. Whenever there is a release, the seeding management module 618 ensures proper seeding of the release into the boxes. In a situation in which the release is a newly released movie and likely in high demand, the seeding management module 618 causes a header and at least one of the segments of the file pertaining to the release to reside in each of the boxes. In another situation in which the release is not a newly released movie but may be popular in demand, the seeding management module 618 causes a header and possibly one of the segments of the file pertaining to the release to reside in each of the boxes. In still another situation in which the release is a classic title and is relatively less popular in demand, the seeding management module 618 causes a header to reside in each of the boxes and the segments to reside in a selected group of the boxes in the network. In yet another situation in which there is a new box just coupled to the network, the network monitoring management 616 is configured to notify the seeding management module 618 of the status of the box. Depending on the status of the existing library in the box, the seeding management module 618 determines what is missing in the library and provides instructions to the box how to update the library from other boxes.

Security management module 620 is provided to secure the objects distributed across the boxes in service. In one embodiment, the security management module 620 is configured to authenticate a user associated with an ordering box and provide one or more security keys and authentication information to the ordering box after the user is authenticated and/or a payment for the order is settled. The security keys, once in an ordering box, may facilitate the decryption of the header and/or segments. The authentication information allows the ordering box to communicate with the designated boxes to fetch needed segments for the playback of the title. In another embodiment, the security management module 620 works in conjunction with the content management module 612 or the seeding management module 618 to encrypt all objects (headers and/or segments) before they are distributed across the boxes in service. In still another embodiment, the security management module 620 provides digital rights management (DRM) of all contents that are distributed as objects across all boxes in service. In still another embodiment, the security management module 620 may remove small portions from a title's file before it is broken into segments and distributed across boxes. When a box orders a title, these portions of the file are supplied directly by the server, perhaps as part of the server response, improving security by ensuring that the title cannot be fully constructed without the active participation of the server.

Commercial information management module 622 is provided to manage commercial information intended to display to users whenever appropriate. Examples of such information may include, but not be limited to, advertisements, special offers, movie trailers and public broadcasts. Such information may be superimposed onto a small part of a display showing a movie, displayed during intervals between two movies, or beginning of showing a movie, or simply requested by a user. Depending on implementation, such information may be appended to a header pertaining to a release or distributed independently according to one or more factors that include geographical locations of the boxes, viewing behaviors or preferred languages of the users.

Source provider management module 624 is provided to manage distribution of any fees paid by users for using any distributed contents originated by providers. Depending on implementation, the source provider management module 624 may be configured to share payments with respective content providers on daily, weekly or monthly basis via the delivery agent 606 or provide financial outlook or statistics of titles in the library being offered.

In further reference to the delivery management module 614 in FIG. 6A, according to one embodiment, the delivery management module 614 is configured to prevent a situation in which one or more of designated boxes become suddenly unavailable or slow down to continue the supply of the required segments to an ordering box. The source information in a response to the ordering box includes backup information for each of the designated boxes. FIG. 6D shows exemplary source information with backup boxes in a table 652 that includes a backup identifier (shown as an IP address) for each of the designated boxes. Should one of the boxes fail to respond to the request for a segment from the ordering box or the segment cannot be received correctly, the backup IP address is immediately called upon to switch to the corresponding backup box that is available to provide or continue to provide a segment that the originally designated box fails to provide.

For completeness, FIG. 6E shows one embodiment in which an ordering box 654 is being supported by three designated boxes 655-657 to receive three respective segments pertaining to a title being ordered in the box 654. Each of the boxes 655-657 is provided with a backup box that has a corresponding identical segment. Specifically, the box 655 is supported by a backup box 658, the box 656 is supported by a backup box 659, and the box 657 is supported by a backup box 660. While a header for the ordered title is played in the ordering box, the three distributed objects are being fetched from the boxes 655-657. If, for some reason, the box 656 refuses to continue providing the segment, the backup box 659 is activated to replace the box 656 to continue providing the segment. In one embodiment, the backup box 659 is configured to join the box 656 to conjointly supply the segment to the box 654 (e.g., each supplying a different portion of the same segment).

FIG. 6F shows another embodiment in which an ordering box 670 is being supported by three designated boxes 671-673 to receive three respective segments pertaining to a title being ordered in the box 670. In operation, the breakdown of an ordering box, for whatever reason it may be, is rare, and the breakdown of several boxes at exactly the same time is even rarer. Therefore the three backup boxes 674-676 for the three designated boxes 671-673 may also be designed as the backup boxes to other designated boxes supplying segments. FIG. 6F shows an ordering box 677 being supplied by two designated boxes 679 and 680 while an ordering box 678 is being supplied by three designated boxes 682-684. To ensure the respective fetching processes are carried out successfully, each of the designated boxes is supported by a backup box, in which case, the two designated boxes 679 and 680 are being backed up by the boxes 674 and 675 and the three designated boxes 682-684 are being backed up by the boxes 674-676. In the event one of the backup boxes 674-676 becoming an active box, the server 600 may immediately designate another box in the field to be the backup box.

Figure 6G:
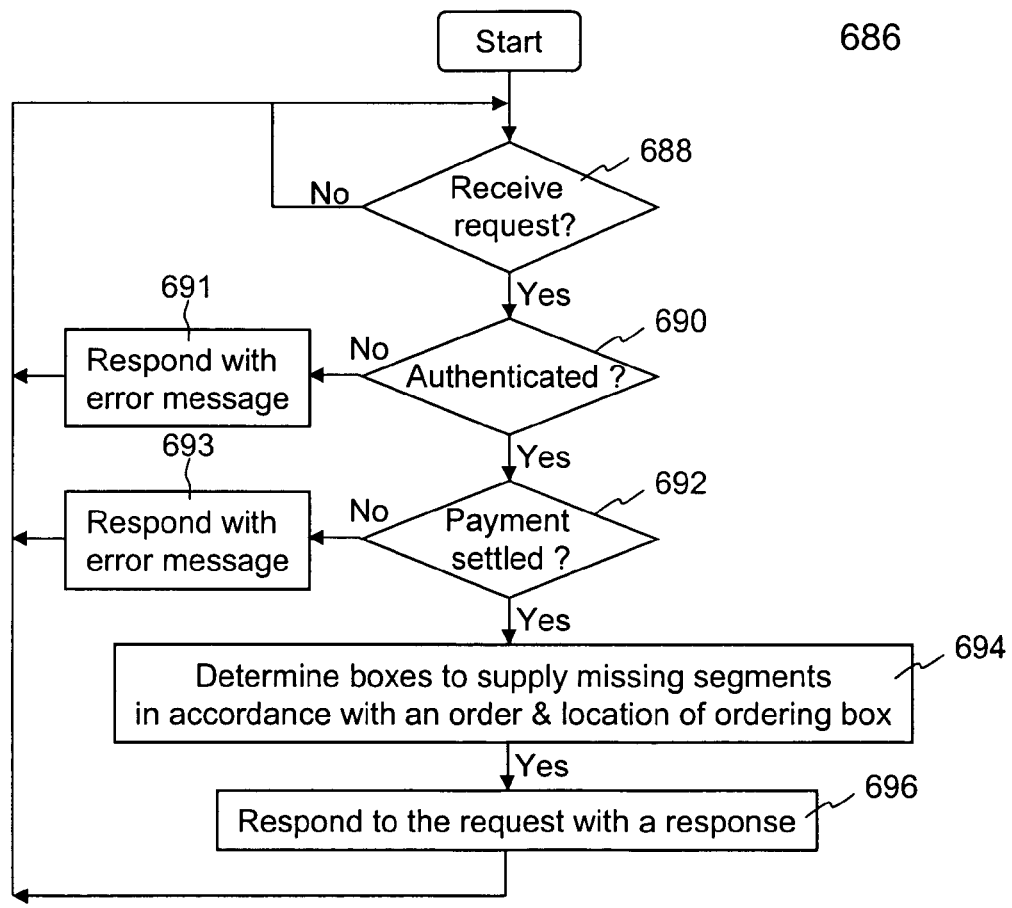
FIG. 6G shows a flowchart or process of starting an instant playback of a selection (i.e., a title) in a library.

Referring now to FIG. 6G, there shows a flowchart or process 686 of starting an instant playback of a selection (i.e., a title) in a library. The process 686 may be implemented in software, hardware or a combination of both as a method, a process, and/or a system. Preferably, the process 686 is executed in a computing device designated as a server facilitating the instant playback of a selected title from a box associated with a user. In one embodiment, the process 686 is employed in a media on demand system. At 688, the process 686 is awaiting a request from an ordering box associated with a user. Typically, a user selects a title and then places an order. As will be further described below, the ordering box generates a request to be transported to the server. The process 686 is activated when such request including the order is received from the ordering box. In general, the request includes an identifier and an IP address of the ordering box, the user account information (e.g., user name), and the order information. Before anything happens in the ordering box, the process 686 proceeds with authentication of the user. If the user is not registered, the process 686 goes to 691 wherein a response including an error message is generated and returned to the ordering box. Depending on implementation, the error message may activate a local module in the ordering box to display an error message or ask the user to register with the system.

After the user is authenticated, the process 686 goes to 692 to determine if payment for the order is settled. In one embodiment, in a registration process, a user may provide credit card information for charges on any order the user places with the system. In another embodiment, the user may receive a monthly statement for collective settlement of charges. If payment is not settled (e.g., the user has a large outstanding balance in his/her account), the process 686 goes to 693 where a response including an error message is generated and returned to the ordering box. The error message may be displayed locally to the user for payment.

After payment is settled, the process 686 goes to 694 to determine a number of boxes that are designated to supply the segments to the ordering box. The exact number of boxes depends on the number of segments the ordering box needs to continue the playback of the selected title. At 696, a response is generated in accordance with the received request. In general, the response includes source information, authentication information and security information. The source information instructs where and how the ordering box can get the needed segment(s) to continue the playback of the selected title. The authentication information allows the ordering box to conduct respective secured communications with boxes designated to supply the needed segment(s). The security information facilitates decryption of any data for the playback of the ordered title. In determining one or more boxes to supply the needed segments among others, one or more several factors may be considered depending on implementation. These factors include, but may not be limited to, respective available bandwidths, geographic locations, histories of availability of these supplying boxes, and the Internet service provider of each box. In addition, whether the ordered title is popular or not, a supplying box is new or not, and a supplying box is busy or not may be considered as well. In any case, the response is transported back to the ordering box or causes the ordering box to start the playback while receiving the needed segments. The process 686 then returns to 688 to await another request.

The process 686 shows that, in one embodiment, the server handles only the ordering process and thus can easily manage a large number of requests for different titles at substantially the same time. One of the possible features, advantages and benefits of some embodiments of the present invention is to shift the data-feeding burden to the users to use the collective unused bandwidth and computing power.

Figure 7A:
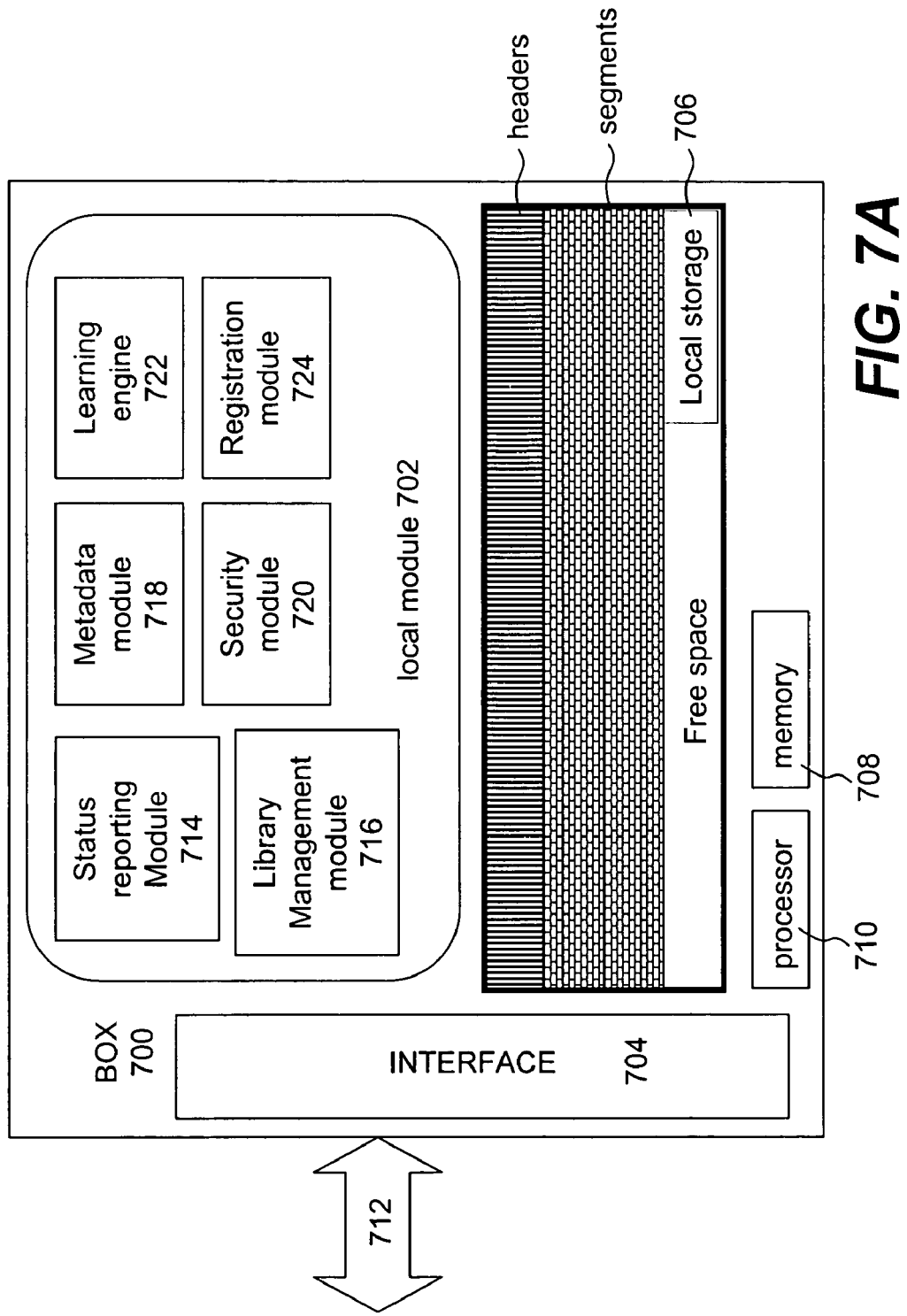
FIG. 7A shows one exemplary implementation of a box that may correspond to any one of the boxes of FIG. 2A.

Referring now to FIG. 7A, there shows one exemplary implementation of a box 700 that may correspond to any one of the boxes (e.g., 207-1, 207-2 and 207-n) of FIG. 2A. The box 700 includes a local module 702, an interface 704, and a storage space 706. The local module 702 is loaded in a memory 708 and executed by a processor 710 to perform its operations. In operation, the box 700 may be provided to a subscriber or user by a service provider or an enterprise offering media services to users. Through the network 712, the box 700 can receive the media services provided by a server (e.g., the server 600 of FIG. 6A). As stated above, examples of the box 700 may include, but not be limited to, a desktop computer, a laptop or notebook computer, a set-top box, a portable device such as a telephone, tablet PC or PDA, etc. The network 712 is preferably a broadband local loop that uses one or more of xDSL, ATM, SONET, fiber optic lines, a private/public telephone network, a wireless connection, or CAT-5. The box 700 is coupled to the network 712 by way of a circuit-switched or packet-switched connection.

As shown in FIG. 7A, there are a plurality of modules that are configured to work cooperatively with each other. It is understood to those skilled in the art that not every module listed in the local module 702 of FIG. 7A must be employed. Depending on actual implementation or needs, the modules may be selectively deployed.

Status reporting module 714 is provided to monitor various statuses affecting the box 700. In one situation, whenever the IP address of the box 700 is changed, the status reporting module 714 reports the new IP address immediately to the server. In another situation, the status reporting module 714 is configured to detect how long the box has been out of the network so that a library in the box can be appropriately updated in a timely fashion. In still another situation, the status reporting module 714 detects the available uploading bandwidth. If the uploading bandwidth is below a certain number, the status reporting module 714 will inform the server in a timely manner so that the box is not to be designated to supply a segment to other boxes. In yet another situation, the status reporting module 714 detects if a segment being fetched from a supplying box is no longer at a desired speed, the status reporting module 714 may cause a communication session to be terminated with the supplying box, and activate a communication session with another supplying box. Other functions performed by the status reporting module 714 may be appreciated in the detailed description herein.

Library management module 716 is provided to manage headers and segments for the many titles in the storage space 706. Through the library management module 716, the server knows what objects the box has. The library management module 716 also dictates what distributed objects (i.e., missing segments) are to be fetched in reference to an ordered title. As the box fetches or receives headers and segments of new and changing titles, the library management module 716 manages them. It will be appreciated that the library management module 716 may communicate with the server to keep the server up to date on available segments to supply to ordering boxes. Such communications may occur after each event (such as receiving a new segment), at predetermined intervals, and/or the like.

Metadata module 718 is provided to facilitate various interactions between the box 700 and a user thereof. The metadata module 718 may be implemented to provide various graphic interfaces to allow the user to browse metadata about the library in the box 700. The metadata may include, but not be limited to, associated information about actors, directors, reviews, blurbs, ratings, etc. about the titles in the library. In one embodiment, the metadata module 718 accepts entries from the users and display desired information in accordance with the entries. In an exemplary application, a user enters one or more characters. The metadata module 718 goes through the metadata and provides a list of titles in accordance with the entered characters. As more characters are entered, the list is progressively narrowed so that a selection of a title may be made easier. In another exemplary application, the metadata module 718 allows a user to specify a type of a title (e.g., action or romance), a list of titles pertaining to the type is displayed so that a selection of a title may be made.

The security module 720 is provided to facilitate secured communications with the server as well as other boxes. In one embodiment, as soon as one of the designated boxes accepts a request from the ordering box to supply a segment, a secured session between the ordering box and the supplying box is established. Consequently, all data transmitted therebetween is secured. The security module 720 is also provided to handle DRM and security of any data for the playback of the ordered title.

Learning engine 722 is provided to best serve users from the viewing behavior of a user and/or network behavior of the box associated with the user. From what a user has browsed, selected or ordered, a list of recommended titles may be automatically generated for the user. Also from the viewing behavior, the learning engine 722 can configure the box to decide which segment(s) to cache locally. In a situation in which a box is offline for a period of time, when the box is back online, the learning engine 722 can configure the box to update the library by prioritizing the titles to be fetched. By acquiring the network behavior of the box, the learning engine 722 knows what bandwidth may be available at different times in a day, which may facilitate the designation of the box to supply segments to other boxes or seeding of the box with releases from the server.

Registration module 724 allows new users to register with the system. Typically, after a user is successfully registered, the registration module 724 is configured to forward the registration information to the server for centralized management. In operation, the registration module 724 acts as a frontline to guard the system, requiring, for example, a username and password. A user must be authenticated by the registration module 724 before an order can be accepted.

Figure 7B:
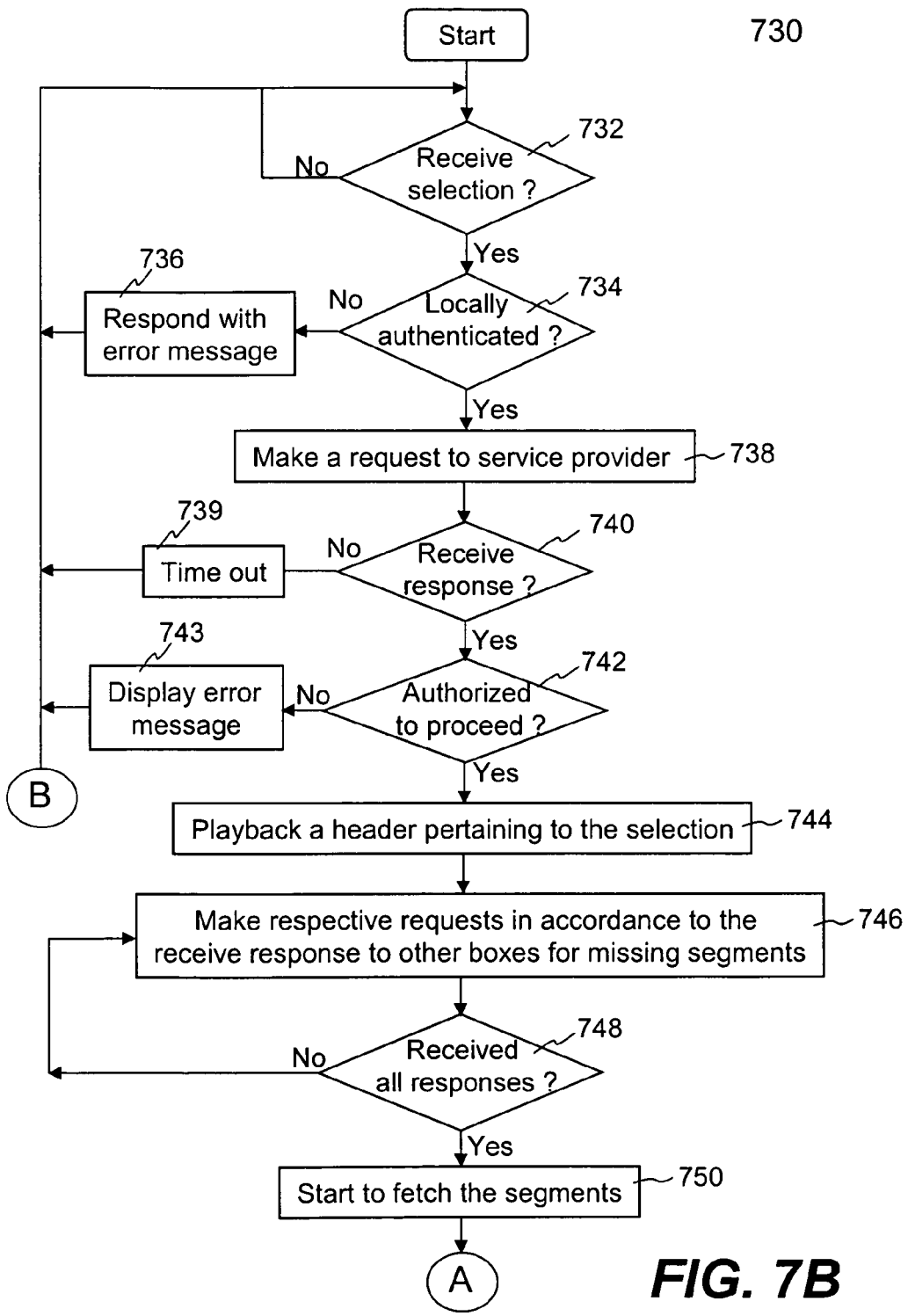
FIG. 7B and FIG. 7C collectively show a flowchart or process of starting an instant playback of a selection (i.e., a title) according to one embodiment of the present invention.
Figure 7C:
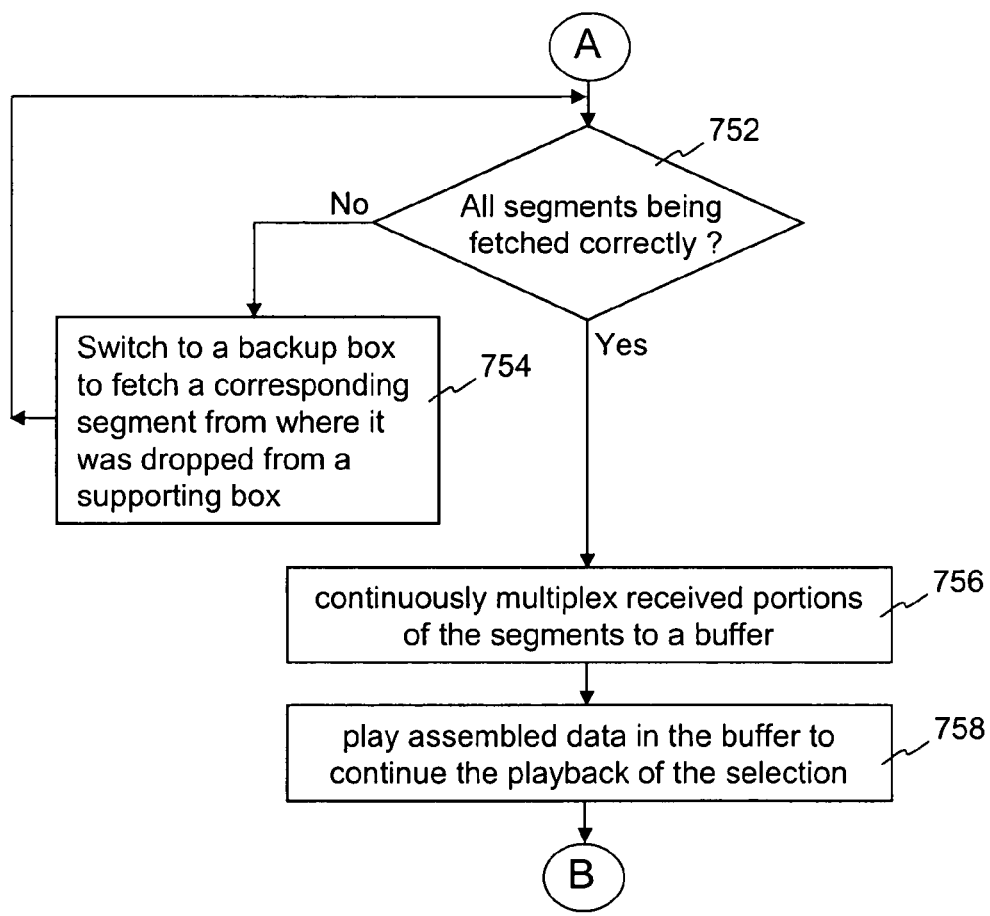

Referring now to FIG. 7B and FIG. 7C, both figures collectively show a flowchart or process 730 of starting instant playback of a selection (i.e., a title). The process 730 may be implemented in software, hardware or a combination of both as a method, a process, and/or a system. Preferably, the process 730 is executed in a computing device that may correspond to a box as used herein. Working in conjunction with the process 686 of FIG. 6G, the process 730 enables instant playback of a file pertaining to a selected title from a box, wherein the file is not completely available at the time of the playback.

At 732, the process 730 awaits a selection from a user. In one case, a user views a display with a plurality of titles from which the user may activate a key (e.g., on a remote control or keyboard) to choose one of the titles. The process 730 is activated when a selection is made by the user. The process 730 goes to 734 to determine whether the user and/or box is properly authenticated. In one embodiment, a registered user is required to input a username and a password for authentication. In another embodiment, a registered user is required to enter a code for authentication. There may be other ways to authenticate a user. In any case, the process 730 needs to ensure that a user and a box is legitimate. If not, the user is sent an error message at 736 that may recommend that the user register with the system.

After a registered user has been authenticated at 734, the box sends a request at 738 in accordance with the selection. The request includes information about the order and the user. The request is transported to the server by a service provider. Upon receiving the request, the server proceeds with process 686 of FIG. 6G. Meanwhile, the box awaits a response from the server at 740. The request may be re-sent if a response is not received within a predefined time (e.g., 5 seconds). However, if the response is not received beyond a certain time (e.g., the network is down), an error message will be displayed at 739.

At 742, the response is received from the server. For proper reason, the response may restrict the user from using the system. If the user is restricted, the process 730 goes to 743 display an error message to the user. Upon authorization, the process 730 goes to 744 where a header of the file pertaining to the selected title is played and may be displayed via a display utility.

At 746, in accordance with the response from the server, the box makes respective requests to other boxes for missing segments. As described above, the response includes source information indicating where the box can fetch the missing segments. For example, if there are four segments for a file and the box stores two of the segments locally, then two segments must be fetched from other boxes. At 748, the box awaits a response from the boxes being requested to supply the missing segments. If one of the boxes is unable to respond to the request, a backup box may be called upon to supply the segment. If the backup box is also unable to respond to the request, the box will send a request to the server for additional backup boxes. In any case, after the designated boxes respond to the requests from the ordering box, the ordering box at 750 starts to fetch the missing segments from the designated and responded boxes.

As described above, the missing segments are expected to arrive at a predetermined speed. If, for some reason, a portion of the network is congested or the box itself is malfunctioning, causing a significant slowdown of the segment being fetched, the process 730 goes to 754 where a backup box is called in to continue supplying the segment being interrupted. The details of 752 and 754 are further described in FIG. 7E.

Figure 7D:
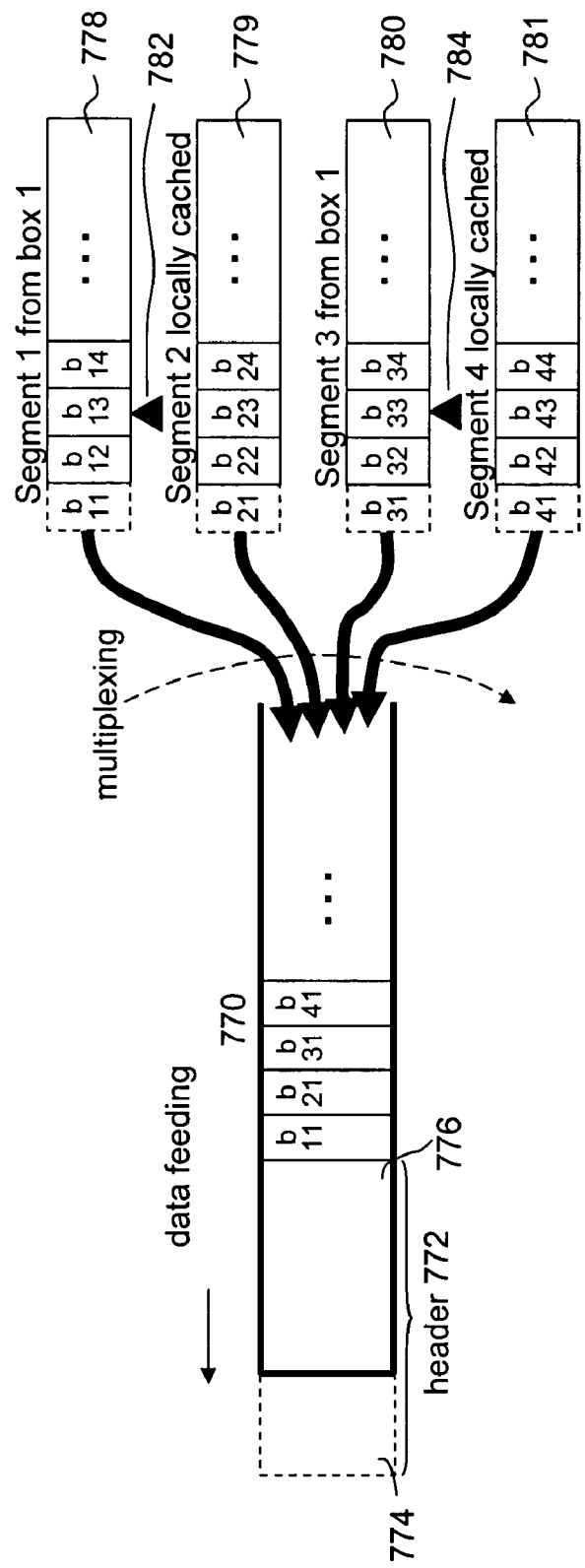
FIG. 7D shows the multiplexing of four streams of segments to generate a data stream for playback as soon as a first portion being played is finished according to one embodiment of the present invention.

If all segments are streaming at predetermined minimum speeds, then, at 756, portions of the segments locally stored and the portions of the segments being streamed in are multiplexed into a buffer as shown in FIG. 7D. A buffer 770, preferably part of the memory 708 of FIG. 7A, is loaded with data of the header 772. As shown in FIG. 7D, a portion 774 of the header 772 has been played out of the buffer 770. The remaining portion 776 of the header 772 is yet to be played. At the same time, the streaming of segments 778 and 780 is being fed into the buffer 770. Segments 778-781 (including the segments locally stored and the segments being streamed in) are multiplexed into the buffer 770. More specifically, a block of data from segment 1, a block of data from segment 2, a block of data from segment 3 and a block of data from segment 4 are multiplexed and successively fed into the buffer 770. As a result, the original order of the data is restored and the remaining portion of the file pertaining to the title is assembled.

Referring back to FIG. 7C, the process 730 goes to 758 to continue playback of the assembled data in the buffer until the entire file for the ordered title is played. The process 730 then goes back to 732 to await another order from the user.

Referring back to FIG. 7D, there show two pointers 782 and 784. Each of the pointers 782 and 784 is used to remember where the data block of a segment is being fed or about to be fed to the buffer 770. In the event, the segment being fetched from a box is interrupted and a backup box is stepped in, the ordering box knows exactly where to start fetching the segment from where it was interrupted in accordance with the pointer. Likewise, similar pointers (not shown) may be provided to remember where the data block of the locally cached segment is being fed or about to be fed to the buffer 770. In the event, the ordering box needs to be reset or is suddenly powered off and back on, these pointers can facilitate the continuation of the playback of the ordered title.

It has been described that a box may execute a number of tasks such as facilitating a search of a desired title among all titles in a library, fulfilling an order from a user, supplying one or more segments to other boxes, updating the library in responding to a release, and reporting its status or network status to a server. Although all tasks are equally important, some may be prioritized ahead of others.

Figure 7E:
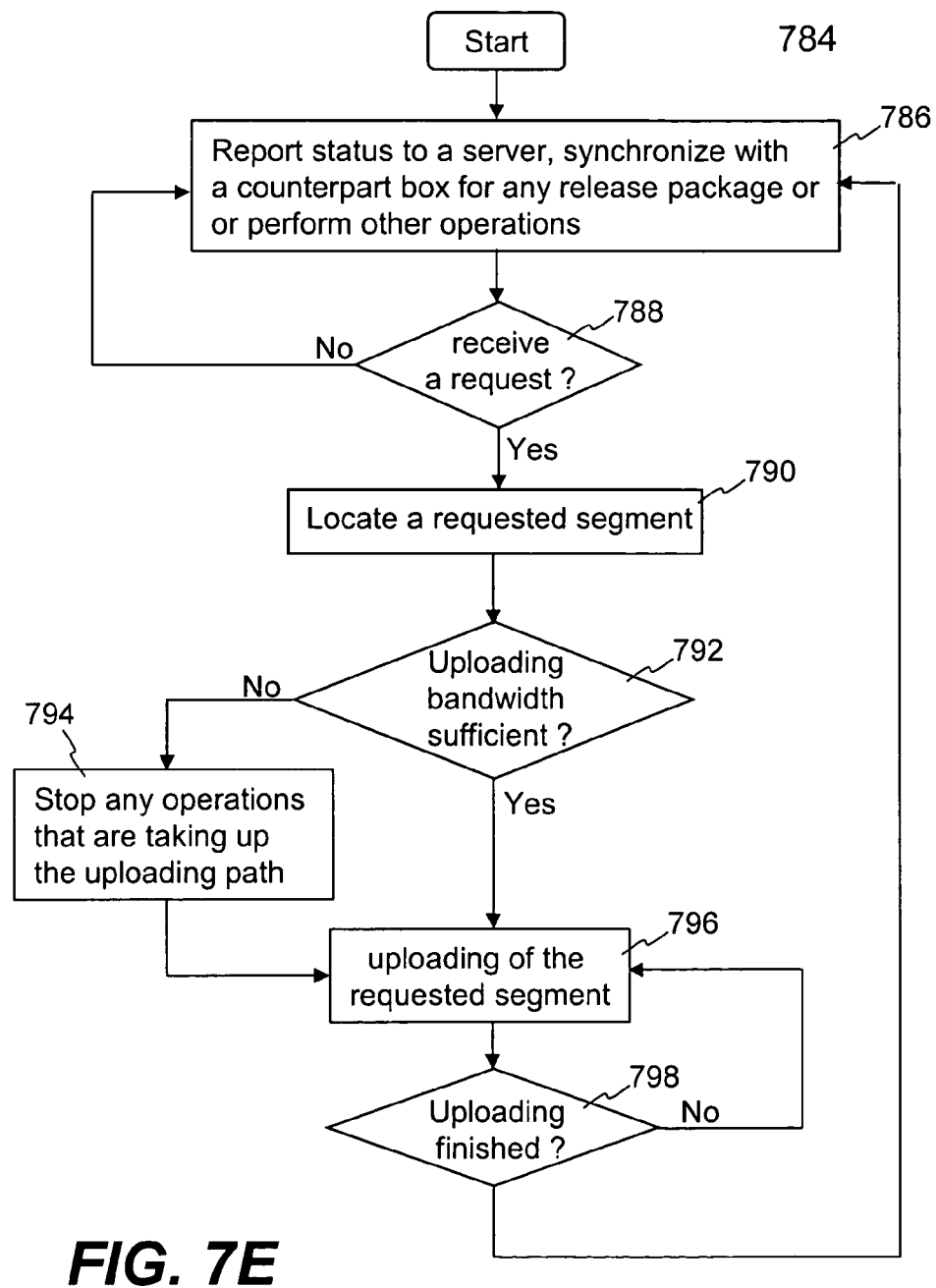
FIG. 7E shows a flowchart or process of prioritizing tasks in a box according to one embodiment of the present invention.

Referring now to FIG. 7E, there shows a flowchart or process 784 of prioritizing tasks in a box according to one embodiment. It should be noted that the process 784 may make the system more efficient. Upon install, a box is not requested to supply or upload a segment to another box. The box is configured to report at 786 its status to a server (e.g., 202 of FIG. 2A) periodically or at a predefined time, synchronize with a counterpart box for updating a release to its library or perform other operations that may affect the overall performance of the box. When reporting to the server, the box sends out a status that may indicate its working condition. In one embodiment, the box is coupled to a public network and assigned a dynamic IP address. To ensure that the box is in communication with the server and other boxes, the box is configured to report any IP address change to the server.

The box either enters a waiting mode or performs other operations at 786. As the box may be a candidate to supply one or more segments to an ordering box, at 788, the process 784 checks whether the box has been requested to supply any segment to another box. If there is no such request received, the box returns to 786 to keeping on doing whatever it was doing. However, upon receiving a request from an ordering box at 788, the process 784 goes to 790 to locate a requested segment among many segments residing in the box. At 792, the box checks whether the uploading bandwidth is sufficient. It is assumed that the uploading bandwidth available at the time of the request is W and the bandwidth required to upload the segment is R. If W>R, the process 784 goes to 796, which means any operations, if there are any, that are using the uploading bandwidth are not concerned. If W<R, the process 784 goes to 794 where any other operations, if there are any, that are using the uploading bandwidth are stopped immediately. Example operations that may take uploading bandwidth includes uploading a release package requested by a counterpart box or seeding a new box.

After such operations are suspended, the process 784 goes to 796 to upload the requested segment to the ordering box. At 798, it is determined whether the uploading of the requested segment is finished. If not, the uploading is continued. When the requested segment is finished uploading, the process 784 goes to 786 to restore or continue what the box was doing or is supposed to be doing.

It should be noted that the process 784 is described for uploading one segment. Those skilled in the art will understand that the process 784 is applicable to uploading more than one segment if the uploading bandwidth permits. It is described above that more than one segment for a top band typically resides in a box. When the uploading bandwidth of a box to the ordering box is sufficient to upload more than one segment, in one embodiment, such box may be designated to upload more than one segment so that the playback of a selected title depends less on other boxes.

Figure 8:
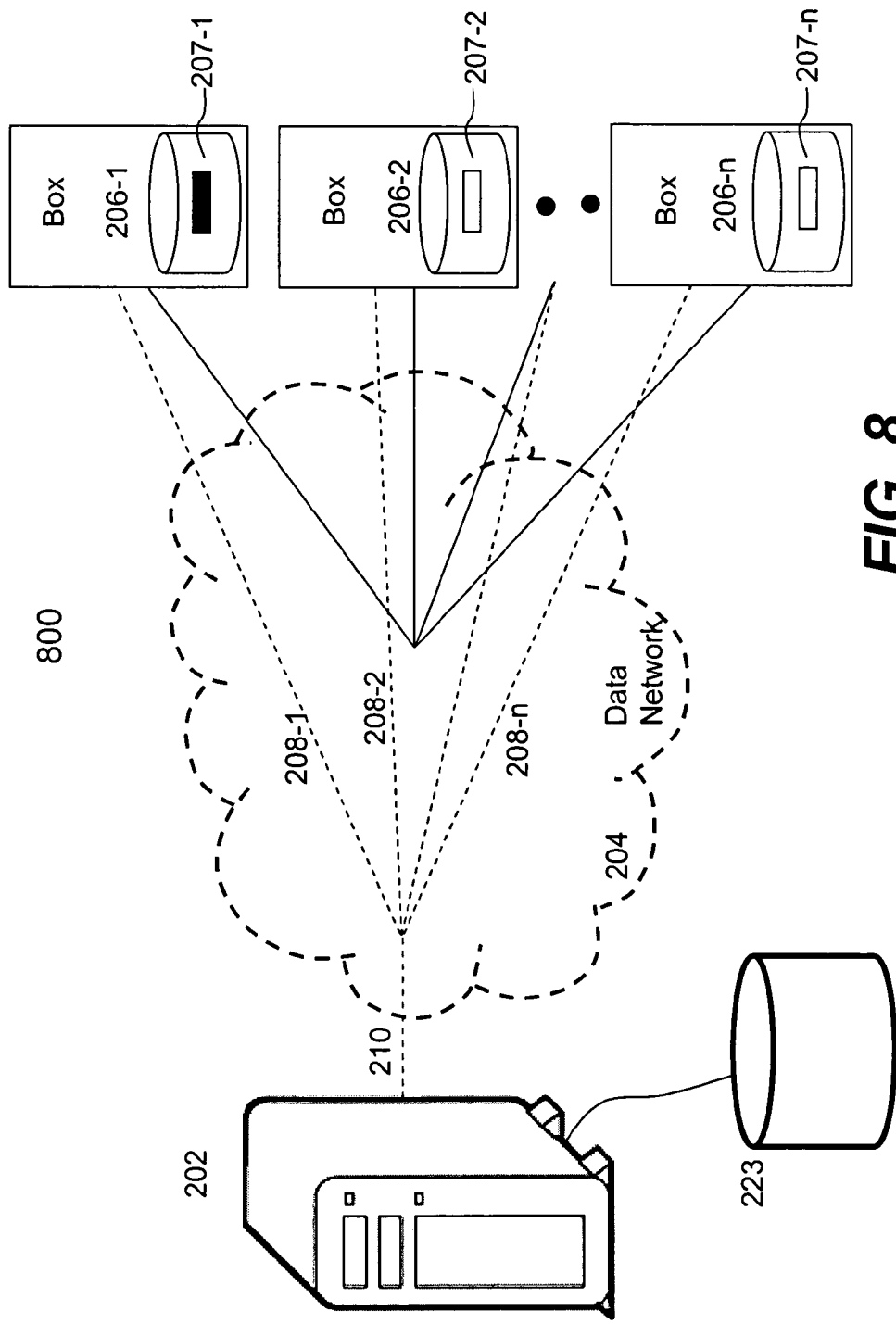
FIG. 8 shows an architecture in which many aspects of the present invention are equally applied thereto.

FIG. 8 shows an architecture 800 in which many aspects of the present invention are equally applied thereto. The architecture 800 may include all the functionality of the architecture of FIG. 2A. As an enhancement to the architecture of FIG. 2A, the architecture 800 includes a server database storing all distributed objects. By storing the distributed objects, the server may support ordering boxes when backup boxes fail, as an initial backup box, when bandwidth is available, etc.

It should be appreciated that the server, in response to a request for a title by an ordering box, need not respond directly to the ordering box. The server 202 may respond by providing instructions to distributed boxes to provide distributed objects to the ordering box. The server 202 may respond by requesting distributed boxes to volunteer their services. Many other possible responses by the server are also possible. It should be further appreciated that requests by ordering boxes need not go to the server. For example, boxes may be given network configuration maps, so that the boxes can make requests directly to other boxes, thereby avoiding using server bandwidth for playback requests.

One skilled in the art will recognize that elements of the system may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier wave. The computer-readable media can also be distributed over network-coupled computer systems so that the computer-readable code is stored and executed in a distributed fashion.

Possible advantages of the invention are numerous. Different embodiments or implementations may yield one or more of the following benefits, features, and advantages. One of them is the instantaneous feature in a media-on-demand system. With a small portion of a file pertaining to a title locally cached, the remaining portion of the file is distributed in segments across one or more boxes. After a title is ordered, provided that a user is authenticated and a payment is properly settled, the locally cached portion is immediately played; during the playback of this locally cached portion, the remaining portion is fetched from the boxes as streams to continue the playback of the title. Another one of them is the way a file is fragmented. Given a file pertaining to a title, the file is fragmented into a header and several segments. The header is a continuous portion of the file while each of the segments is a decimated portion for the remaining portion for the file. As the segments are being fetched, the segments are multiplexed to restore the order of the original data for playback. Still another possible benefit, feature, and advantage is the underlying mechanism of updating a library in a box synchronously or asynchronously without preventing the box from servicing others. When a release becomes available, a release package to be locally cached is propagated asynchronously to the box from other boxes, instead of being transmitted from a central server. Other benefits, features, and advantages are also possible.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. For example, in one embodiment, the size of a header for a file may be reduced to zero, in other words, a file is fragmented into a plurality of segments that can be distributed into boxes. Also, when an order of a title is placed, the server may identify the sources that will supply data for the order, and then contact these suppliers itself to initiate data transfers, instead of requiring the ordering box to initiate communication with the sources. In fact, an ordering box could even dynamically obtain the source information from boxes that cache respective segments for the title instead of requiring the server to identify the supplying boxes. Accordingly, the scope of the present invention is defined by the appended claims rather than the foregoing description of embodiments.

We claim:

1. A method for dynamically updating a database of media content in a plurality of devices coupled to a network, the method being implemented by one or more processors and comprising:

generating a data package pertaining to a first media content, wherein the data package includes (i) a header segment corresponding to a beginning portion of the first media content, and (ii) a plurality of tail segments corresponding to the remaining portion of the first media content;

transmitting the data package to a first set of devices, of the plurality of devices, such that the header segment is transmitted to each device in the first set of devices and each of the plurality of tail segments is transmitted to at least one device in the first set of devices; and enabling the first set of devices to distribute at least a portion of the received data package, including at least the header segment, to the remainder of the plurality of devices, to enable any of the plurality of devices to initiate instant playback of the first media content using: (i) the header segment, and (ii) each of the plurality of tail segments as provided, at least in part, by other devices in the plurality of devices.

2. The method as recited in claim 1, wherein each of the plurality of devices is configured to locally store at least the header segment pertaining to the first media content.

3. The method as recited in claim 1, wherein duration of playback using the header segment is long enough to ensure reception of at least some of the tail segments to enable continuous playback of the first media content.

4. The method as recited in claim 1, wherein enabling the first set of devices to distribute at least a portion of the received data package to the remainder of the plurality of devices comprises collectively configuring the first set of devices to distribute at least the portion of the data package to the remainder of the plurality of devices.

5. The method as recited in claim 1, wherein a first device, of the plurality of devices, is configured to stop receiving data pertaining the first media content upon receiving an input from a user of the first device, the input including a request for playback of a second media content, wherein at least a header segment pertaining the second media content is stored locally on the first device.

6. The method as recited in claim 1, further comprising enabling one or more devices, in the first set of devices, to distribute at least the portion of the data package to other devices, in the first set of devices, which have not successfully received at least the header segment pertaining to the first media content.

7. The method as recited in claim 1, wherein enabling the first set of devices to distribute at least a portion of the received data package to the remainder of the plurality of devices comprises configuring the first set of devices to transmit at least the portion of the data segment, via the network, to the remainder of the plurality of devices during an interval in which data traffic over the network is relatively low.

8. The method as recited in claim 1, wherein enabling the first set of devices to distribute at least a portion of the received data package to the remainder of the plurality of devices comprises configuring the first set of devices to selectively transmit copies of one or more of the plurality of tail segments to the remainder of the plurality of devices in accordance with a release instruction, the release instruction identifying which of the remaining devices are to receive at least one of the copied tail segments.

9. The method as recited in claim 1, wherein enabling the first set of devices to distribute at least a portion of the received data package to the remainder of the plurality of devices comprises, in response to receiving a request from a second device of the remainder of the plurality of devices, configuring the first set of devices to transmit a copy of one or more of the plurality tail segments to the second device, wherein the request indicates the one or more of the plurality of tail segments to be transmitted to the second device.

10. The method as recited in claim 1, wherein a gossip protocol is used to enable the first set of devices to distribute at least the portion of the data package to each of the remainder of the plurality of devices.

11. The method as recited in claim 1, wherein upon receiving at least the portion of the data package, each of the plurality of devices is configured to update the database of media content to include the first media content.

12. The method as recited in claim 11, wherein one or more of the plurality of devices are configured to update the database of media content by replacing a third media content in the database with the first media content, in accordance with a release instruction, by discarding at least a header segment pertaining to the third media content.

13. The method as recited in claim 1, wherein each device in the first set of devices is configured to selectively transmit at least the portion of the data package to one or more of the remainder of the plurality of devices based on at least one of a geographic location, a time zone, or an internet service provider associated with the one or more remaining devices.

14. A system for dynamically a database of media content in a network, the system comprising:

a first device, coupled to the network, and configured to generate a data package pertaining to a first media content, wherein the data package includes (i) a header segment corresponding to a beginning portion of the first media content, and (ii) a plurality of tail segments corresponding to the remaining portion of the first media content;

a plurality of devices, coupled to the network, each of the plurality of devices being configured to receive a portion of the data package from at least one of the first device or others of the plurality of devices;

wherein the first device is further configured to transmit the data package to a first set of devices, of the plurality of devices, such that the header segment is transmitted to each device in the first set of devices and each of the plurality of tail segments is transmitted to at least one device in the first set of devices; and wherein the first set of devices are configured to distribute at least a portion of the received data package, including at least the header segment, to the remainder of the plurality of devices, to enable any of the plurality of devices to initiate instant playback of the first media content using: (i) the header segment, and (ii) each of the plurality of tail segments as provided, at least in part, by other devices in the plurality of devices.

15. The system as recited in claim 14, wherein each of the plurality of devices is configured to locally store at least the header segment pertaining to the first media content.

16. The system as recited in claim 14 wherein a duration of playback using the header segment is long enough to ensure reception of at least some of the tail segments to enable continuous playback of the first media content.

17. The system as recited in claim 14, wherein the first set of devices are collectively configured to distribute at least the portion of the data package to the remainder of the plurality of devices.

18. The system as recited in claim 14, wherein a first device, of the plurality of devices, is further configured to stop receiving data pertaining to the first media content upon receiving an input from a user of the first device, the input including a request for playback of a second media content, wherein at least a header segment pertaining to the second media content is stored locally on the first device.

19. The system as recited in claim 17, wherein one or more devices in the first set of devices are further configured to distribute at least the portion of the received data package to other devices, in the first set of devices, which have not successfully received at least the header segment pertaining to the first media content.

20. The system as recited in claim 14, wherein the first device is configured to distribute the received data package to the first set of devices during an interval in which data traffic over the network is relatively low.

21. The system as recited in claim 14, wherein the first set of devices are configured to selectively transmit copies of one or more of the plurality of tail segments to the remainder of the plurality of devices in accordance with a release instruction, the release instruction identifying which of the remaining devices are to receive at least one of the copied tail segments.

22. The system as recited in claim 14, wherein, in response to receiving a request from a second device, of the remainder of the plurality of devices, the first set of devices are configured to transmit a copy of one or more of the plurality of tail segments to the second device, wherein the request indicates the one or more of the plurality of tail segments to be transmitted to the second device.

23. The system as recited in claim 14, wherein a gossip protocol is used to enable the first set of devices to distribute at least the portion of the data package to each of the remainder of the plurality of devices.

24. The system as recited in claim 14, wherein upon receiving at least the portion of the data package, each of the plurality of devices is configured to update the database of media content to include the first media content.

25. The system as recited in claim 24, wherein one or more of the plurality of devices are configured to update the database of media content by replacing a third media content in the database with the first media content, in accordance with a release instruction, by discarding at least a header segment pertaining to the third media content.

26. The system as recited in claim 14, wherein each device in the first set of devices is configured to transmit at least the portion of the data package to one or more of the remainder of the plurality of devices based on at least one of a geographic location, a time zone or an internet service provider associated with the one or more remaining devices.

27. The method as recited in claim 1, wherein enabling the first set of devices to distribute at least the header segment to the remainder of the plurality of devices comprises individually configuring each of one or more devices, in the first set of devices, to distribute at least the portion of the data package to one or more of the plurality of devices.

28. The system as recited in claim 14, wherein each of one or more devices, in the first set of devices, is individually configured to distribute at least the portion of the data package to the remainder of the plurality of devices.

* * * * *